United States Patent
Schmidt

(10) Patent No.: US 8,976,012 B2
(45) Date of Patent: Mar. 10, 2015

(54) TOUCH PANEL ASSEMBLY WITH HAPTIC EFFECTS AND METHOD OF MANUFACTURUING THEREOF

(75) Inventor: Robert Schmidt, Livonia, MI (US)

(73) Assignee: Methode Electronics, Inc., Carthage, IL (US)

( * ) Notice: Subject to any disclaimer, the term of this patent is extended or adjusted under 35 U.S.C. 154(b) by 665 days.

(21) Appl. No.: 12/730,013

(22) Filed: Mar. 23, 2010

(65) Prior Publication Data
US 2010/0238132 A1 Sep. 23, 2010

Related U.S. Application Data

(63) Continuation-in-part of application No. 12/408,824, filed on Mar. 23, 2009, now Pat. No. 8,169,306.

(60) Provisional application No. 61/249,873, filed on Oct. 8, 2009.

(51) Int. Cl.
*H04B 3/36* (2006.01)
*G06F 3/042* (2006.01)
*G06F 3/01* (2006.01)
*G06F 3/0488* (2013.01)

(52) U.S. Cl.
CPC ............ *G06F 3/016* (2013.01); *G06F 3/04886* (2013.01)
USPC ....................... 340/407.1; 345/175

(58) Field of Classification Search
CPC .................................................. C07D 209/08
USPC ..................... 340/407.1, 407.2; 345/173–179, 345/156–158; 178/18.01
See application file for complete search history.

(56) References Cited

U.S. PATENT DOCUMENTS

| | | | |
|---|---|---|---|
| 6,031,524 A | 2/2000 | Kunert | |
| 6,429,846 B2 * | 8/2002 | Rosenberg et al. | 345/156 |
| 6,819,312 B2 * | 11/2004 | Fish | 345/156 |
| 7,148,875 B2 * | 12/2006 | Rosenberg et al. | 345/156 |
| 7,205,978 B2 * | 4/2007 | Poupyrev et al. | 345/157 |
| 7,215,329 B2 | 5/2007 | Yoshikawa et al. | |
| 7,245,048 B2 | 7/2007 | Fujii et al. | |
| 7,525,415 B2 * | 4/2009 | Yatsu et al. | 340/407.2 |
| 8,265,708 B2 * | 9/2012 | Lee et al. | 455/567 |
| 8,421,609 B2 * | 4/2013 | Kim et al. | 340/407.1 |
| 2002/0033795 A1 | 3/2002 | Shahoian et al. | |
| 2005/0017947 A1 * | 1/2005 | Shahoian et al. | 345/156 |
| 2005/0253643 A1 | 11/2005 | Inokawa et al. | |
| 2007/0057927 A1 * | 3/2007 | Prados | 345/173 |
| 2008/0062145 A1 * | 3/2008 | Shahoian et al. | 345/173 |
| 2009/0174672 A1 | 7/2009 | Schmidt | |
| 2009/0320533 A1 * | 12/2009 | Ruan et al. | 70/58 |

FOREIGN PATENT DOCUMENTS

| | | |
|---|---|---|
| EP | 0419145 A1 | 3/1991 |
| JP | 2006119849 A | 5/2006 |

(Continued)

*Primary Examiner* — Benjamin C Lee
*Assistant Examiner* — Sigmund Tang
(74) *Attorney, Agent, or Firm* — Blank Rome LLP

(57) ABSTRACT

An assembly for providing haptic effects includes a panel adapted to be mated to another structure, a frame placed around and spaced apart from the panel, at least one flexible coupling to connect the panel to the frame, a display connected to the panel so as to be stationary with respect to the panel, and a touch screen assembly connected to the frame. The touch screen assembly is placed over the display.

20 Claims, 28 Drawing Sheets

(56) References Cited

FOREIGN PATENT DOCUMENTS

| JP | 2006215738 A | 8/2006 |
| JP | 2007034954 A | 2/2007 |
| KR | 200258353 A | 4/2004 |
| WO | 0108132 A1 | 2/2001 |

\* cited by examiner

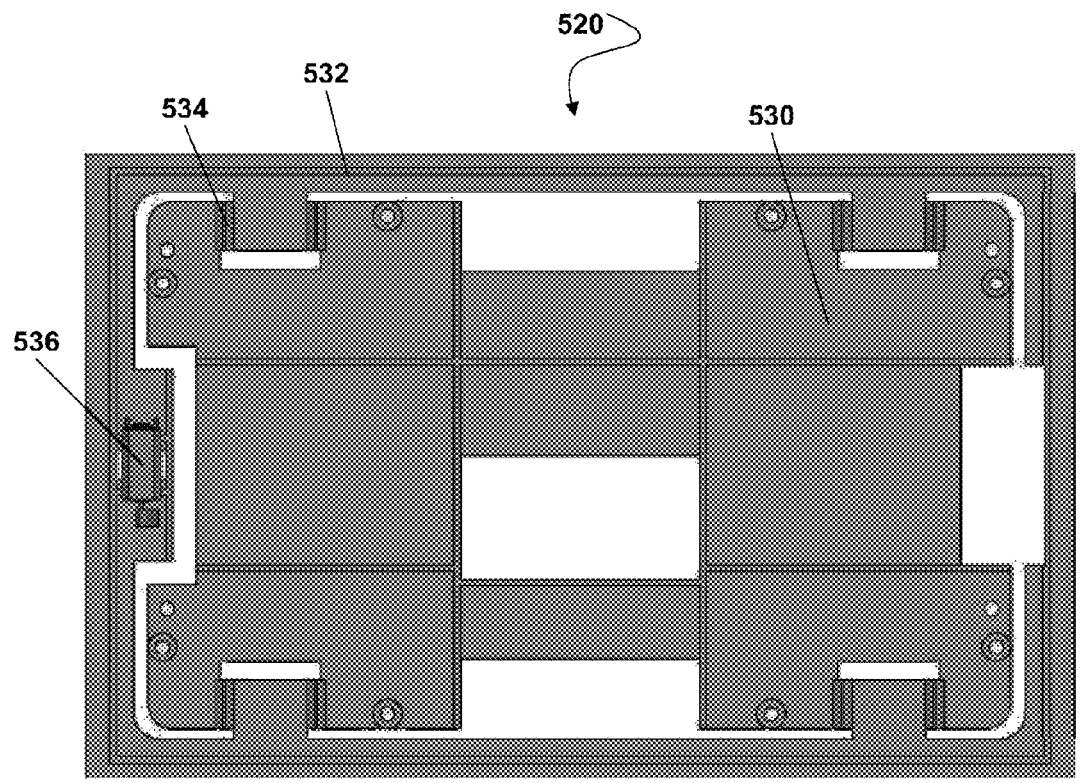
FIG. 23
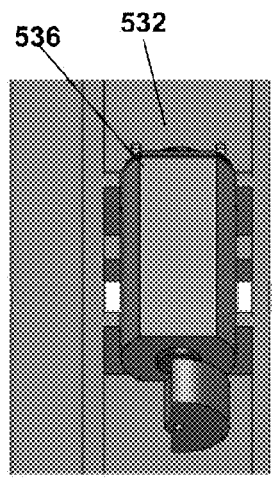 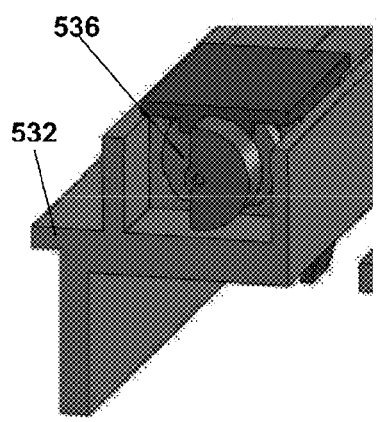
FIG. 24  FIG. 25

TOUCH PANEL ASSEMBLY WITH HAPTIC EFFECTS AND METHOD OF MANUFACTURUING THEREOF

CROSS-REFERENCES TO RELATED APPLICATIONS

This application claims priority to U.S. Patent Application Ser. No. 61/249,873, filed Oct. 8, 2009, entitled "Touch Panel Assembly with Haptic Effects and Method of Manufacturing Thereof" by R. Schmidt and is a continuation in part of U.S. patent application Ser. No. 12/408,824, filed Mar. 23, 2009, entitled "Touch Panel Assembly with Haptic Effects and Method of Manufacturing Thereof" by R. Schmidt et al., the disclosures of which are incorporated herein by reference in their entirety.

FIELD OF THE INVENTION

The invention relates to systems with haptic effects. In particular, the invention relates to touch panels with haptic feedback.

BACKGROUND OF THE INVENTION

In many present day situations, a person has to adjust various functions and operations of several different electrical and mechanical devices. For example, the driver of a car while driving may have to adjust or control a heating and cooling system, an audio entertainment system, windows, locks, a cruise control system and possibly a navigation system. Conventionally, the user would use buttons, switches, knobs, and other similar mechanical controls to adjust the various functions or operations of these devices. However, with the increased number of controllable devices, along with the increased complexity of each individual device, a person may be required to provide many different inputs through several different buttons, switches, knobs, and other mechanical controls.

To replace the many, separate, and different mechanical controls and to simplify and enhance the control of these many devices, a single aggregate instrument that can relay commands to several devices is often employed, such as a touch panel. By using a touch panel, the user can adjust several different devices by interacting with a hierarchical menu shown through the touch panel from an underlying display to select a particular device and to select a particular function associated with that device.

The touch panel replaces mechanical buttons and switches but typically does not provide the same tactile feedback as a mechanical button or switch. Thus, to enhance the user's interaction with the touch panel, feedback to the user may be provided through visual, auditory, kinesthetic, and/or tactile cues. Kinesthetic feedback, such as active and resistive force feedback, and tactile feedback, such as vibration, texture, and heat, is collectively referred to as "haptic feedback." Haptic feedback can be used to convey physical force sensations to the user, and generally, the physical forces simulate actuating a mechanical button or switch and provide the user with an indication that the user's input has been accepted.

Conventional haptic feedback can be provided by linear actuators, piezoelectric films, or oscillating mass actuators. Linear actuators provide linear motion using an electromagnetic actuator and simulate a push response. In one conventional system, four individual linear actuators are placed at the four corners of a touch panel. Based on the user's interaction with the touch panel, the four individual actuators will simultaneously impart a slight linear motion to the touch panel so that the user perceives a push response. However, conventional haptic feedback systems using four individual linear actuators are costly to manufacture and difficult to manufacture because such systems require precise alignment of the individual linear actuators to each other for proper movement. Also, linear actuators may not provide an audible feedback that the user's input has been received or accepted.

Haptic feedback is also provided by using piezoelectric films. Piezoelectric films are typically placed over a touch panel and vibrate in response to a touch by the user. Thus, it vibrates or flexes the surface of the touch panel. However, conventional haptic feedback systems using piezoelectric film that vibrate or flex a surface often experience premature failure due to surface stress cracks or subsurface solder joint failures. Also, for certain applications, vibrating the touch panel and its underlying display is not practical.

Furthermore, haptic feedback is also provided by oscillating mass actuators. Oscillating mass actuators shake a component, such as the touch panel and its display, or in some cases, the entire assembly. However, the entire mass of a touch panel assembly cannot be vibrated or pulsed with conventional mounting and assembly systems. Also, similar to systems using piezoelectric films, in certain applications, it may not be practical to vibrate or move the touch panel system and its underlying display.

Lastly, conventional haptic feedback moves the entire touch panel assembly, which can damage the touch panel or its underlying display. In particular, frequent, small movements can damage the fragile electronic components within the touch panel or its underlying display.

Thus, there is a need for a system that provides haptic feedback at reduced cost, simplifies manufacturing of devices with haptic feedback, and reduces premature component failure. Also, there is a need for a system that provides haptic feedback but avoids moving an entire touch panel assembly.

SUMMARY OF THE INVENTION

Accordingly, an aspect of the invention can provide an assembly for providing haptic effects. The assembly for providing haptic effects includes a panel adapted to be mated to another structure, a frame placed around and spaced apart from the panel, at least one flexible coupling to connect the panel to the frame, a display connected to the panel so as to be stationary with respect to the panel, and a touch screen assembly connected to the frame. The touch screen assembly is placed over the display.

Another aspect of the invention can provide an assembly for providing haptic effects. The assembly includes a panel adapted to be mated to another structure, a frame placed around and spaced apart from the panel, at least one flexible coupling to connect the panel to the frame, a display connected to the panel so as to be stationary with respect to the panel, and a touch screen assembly connected to the frame. The panel includes one or more cutouts extending into the panel, and the frame includes one or more extensions extending away from the frame. The one or more extensions are received by a respective one of the one or more cutouts. The at least one flexible coupling includes a loop. The touch screen assembly is placed over the display.

Yet another aspect of the invention can provide an assembly with haptic effects. The assembly includes a panel adapted to be mated to a vehicle, a frame placed around and spaced apart from the panel, at least one flexible coupling to connect the panel to the frame, a haptic actuator connected to the frame and the panel, an input device mated to the frame, and a display connected to the panel so as to be stationary with respect to the panel. The panel includes one or more cutouts extending into the panel, and the frame includes one or more extensions extending away from the frame. The one or more extensions are received by a respective one of the one or more cutouts. The at least one flexible coupling includes a loop. The input device is adapted to cause movement of the frame when an input is received, and the display is placed under the input device.

Other objects, advantages and salient features of the invention will become apparent from the following detailed description, which, taken in conjunction with the annexed drawings, discloses a preferred embodiment of the invention.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 23 is a plan view of a flex frame according to another embodiment of the invention;

FIG. 24 is a perspective view of a haptic actuator of the flex frame illustrated in FIG. 23;

FIG. 25 is a perspective view of the haptic actuator illustrated in FIG. 24;

DETAILED DESCRIPTION OF THE INVENTION

Figure 1:
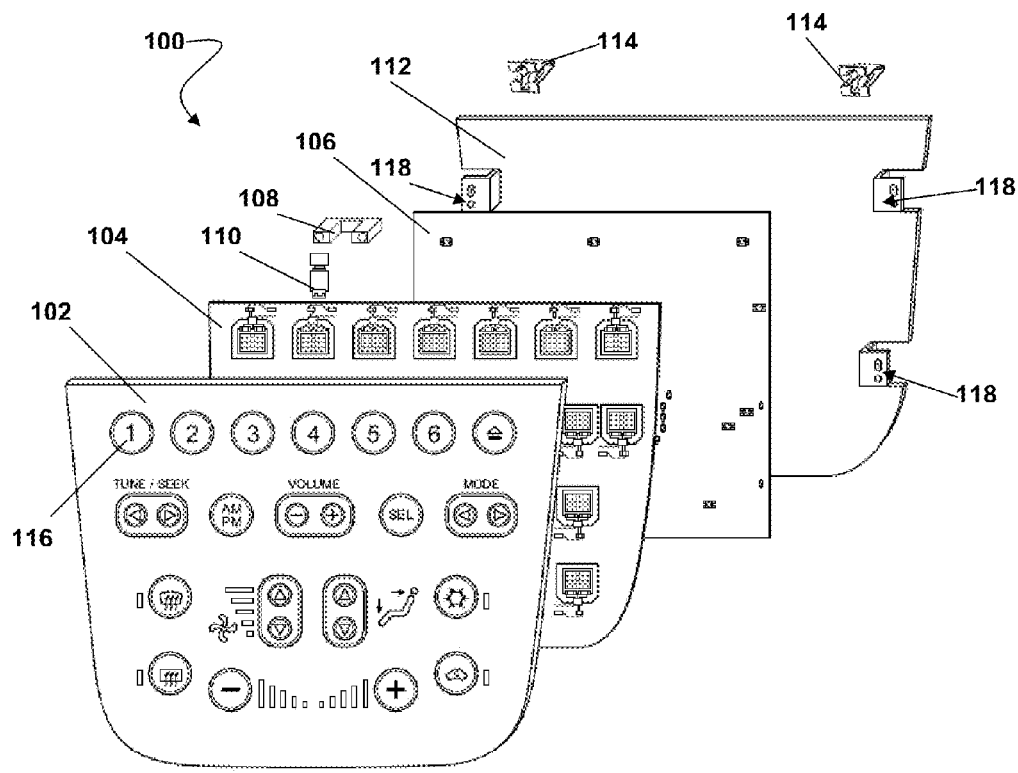
FIG. 1 is an exploded perspective view of a touch panel assembly with haptic effects according to an exemplary embodiment of the invention.

Referring to FIGS. 1 to 36, the invention can provide a touch panel assembly 100 with haptic effects and a method of manufacturing the touch panel assembly 100 with haptic effects. The touch panel assembly 100 can provide haptic feedback when the user manipulates an input device 116. The invention can also provide an assembly 500 that avoids moving an entire touch panel assembly.

Referring to FIGS. 1 and 2A-2D, the touch panel assembly 100 according to one preferred embodiment is shown. In the depicted embodiment, the touch panel assembly 100 can be installed in a dashboard of a vehicle, however the invention is not limited to only touch panel assemblies 100 of a vehicle. The invention is applicable to touch panel assemblies 100 for other applications. However, in the interest of simplifying and facilitating the description of the invention without intending to limit the invention, an exemplary embodiment where the touch panel assembly 100 is used in a vehicle is described.

In the exemplary embodiment shown, the touch panel assembly 100 can include a bezel 102, a sensor circuit board 104, an interface circuit board 106, a retainer bracket 108, a haptic effect generator 110, a rear cover 112, and one or more mountings 114. Terms such as "front," "forward," "back," "rear," "to the right," "to the left," and other similar terms are not intended to limit the invention. Instead, such terms are used to facilitate describing the positions of components relative to other components. As best shown in the FIGS. 2C and 2D, the bezel 102, the sensor circuit board 104, the interface circuit board 106, and the rear cover 112 can be disposed in layers with the bezel 102 and the rear cover 112 substantially encasing the sensor circuit board 104, the interface circuit board 106, the retainer bracket 108, and the haptic effect generator 110 to form the touch panel assembly 100.

The bezel 102 can provide a surface that a user interacts with to provide an input to the touch panel assembly 100. The bezel 102 can include at least one input device 116. The input device 116 can be pressure sensitive through resistive sensors, electrically sensitive through capacitive sensors, acoustically sensitive through surface acoustic wave sensors, photo sensitive through infrared sensors, and the like. In the embodiment shown, the input device 116 can be depressed by the user. In other embodiments, the input device 116 can be a switch, rotary knob, pull switch, or some other input device that can be implemented with the touch panel assembly 100. Furthermore, the bezel 102 can be marked with words, letters, numbers, figures, or other indicia to indicate the function of the input device 116. The bezel 102 can be made from any suitably rigid material, including, but not limited to, plastics, metals, leathers, glass, wood, combinations of the aforementioned, and other similar materials. The choice of material may also be suitable for the type of input device 116 used with the touch panel assembly 100. For example, in the embodiment shown, plastics are used because they have the necessary elastic flexibility that can be used with a depressible input device 116.

Also, although the depicted embodiment has a bezel 102, in other embodiments, the bezel 102 can be replaced with a touch screen, one or more touch switches, one or more touch pads, and other similar devices that can accept an input from a user. The touch screen, touch switches, touch pads, and the like can be made transparent or translucent and placed over a display device that generates graphical images. The display device can be a liquid crystal display, a plasma display, an electroluminescent display, a light emitting diode display, or some other device for displaying images, such that the user responds to images to provide an input to the touch panel assembly 100 instead of the indicia of a bezel 102.

Figure 2A:
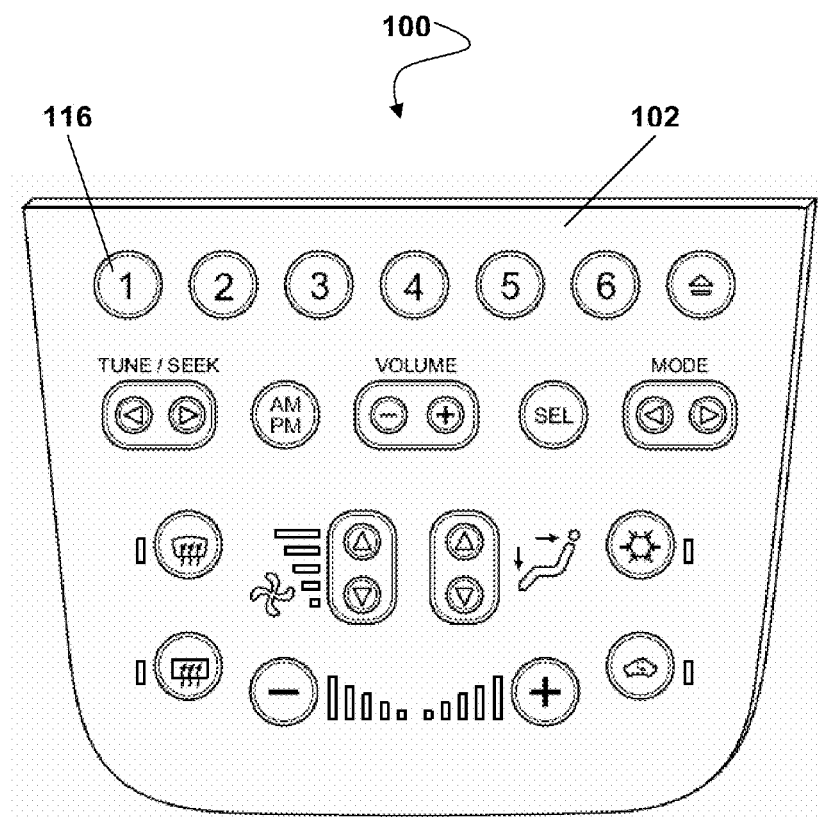
FIG. 2A is a front elevational view of the touch panel assembly illustrated in FIG. 1.
Figure 2B:
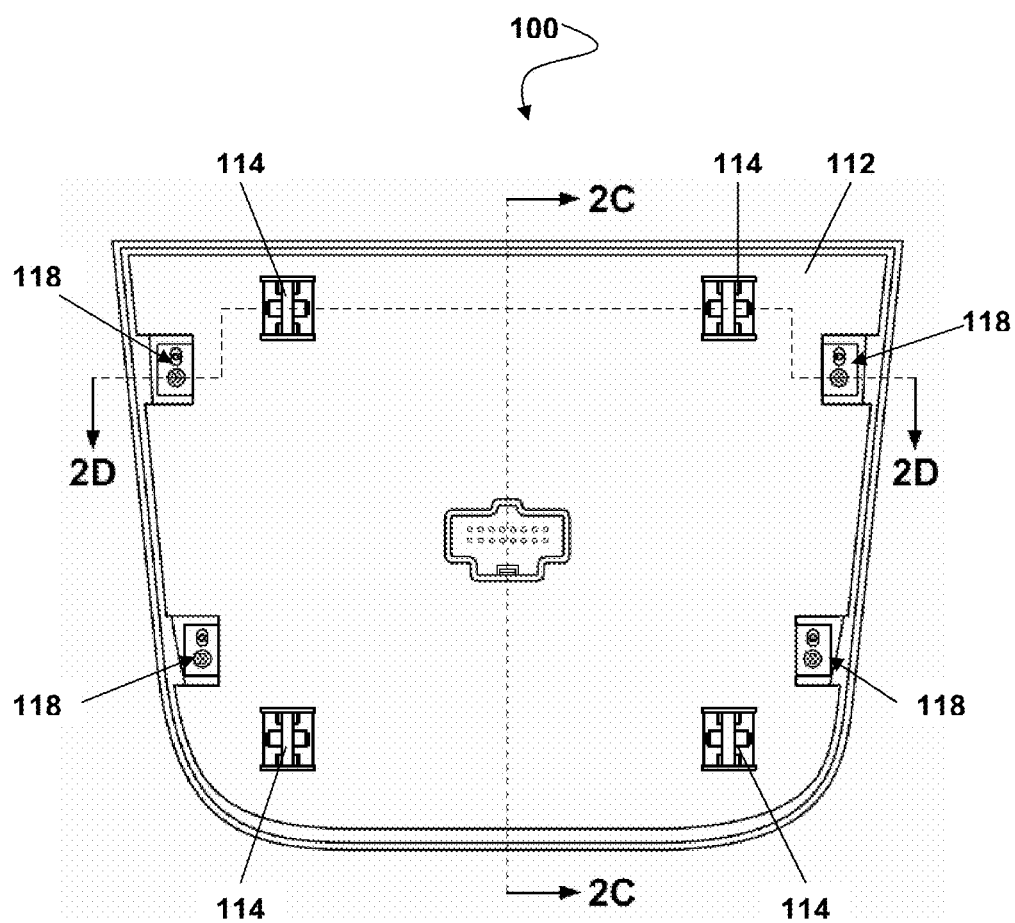
FIG. 2B is a rear elevational view of the touch panel assembly illustrated in FIG. 1.
Figure 2C:
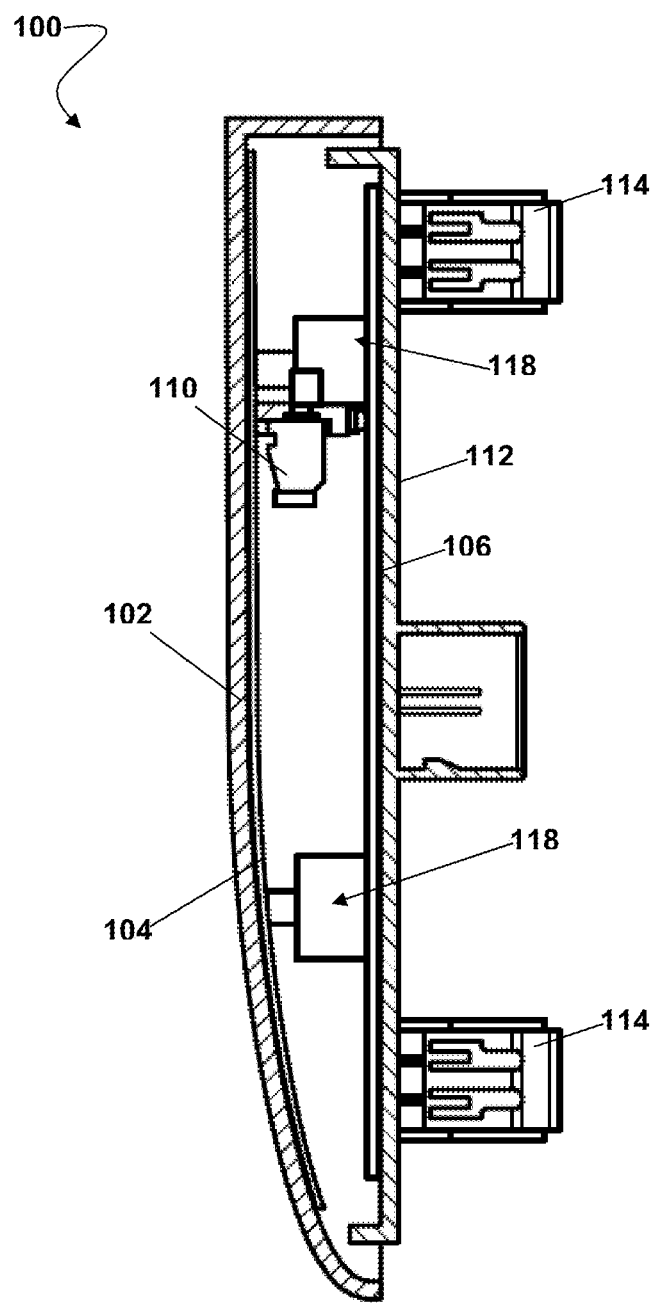
FIG. 2C is a side elevational sectional view along line 2C-2C of the touch panel assembly illustrated in FIG. 2B.
Figure 2D:
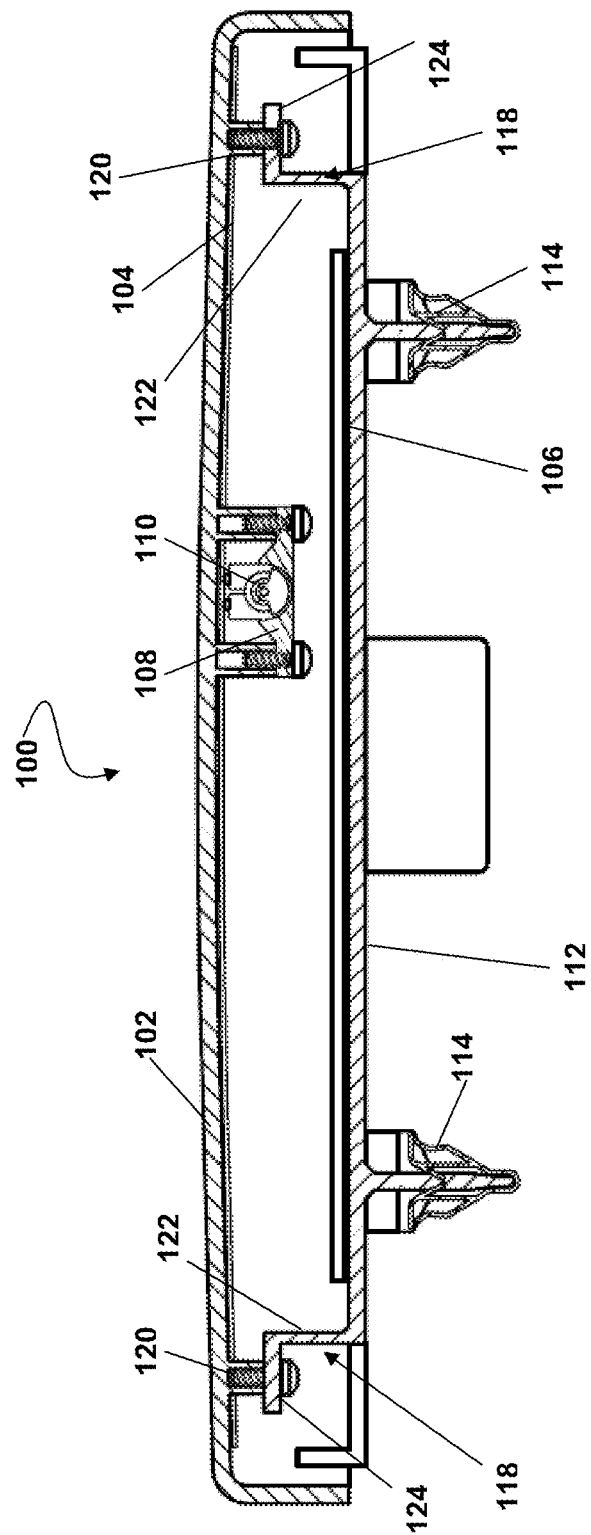
FIG. 2D is a top plan sectional view along line 2D-2D of the touch panel assembly illustrated in FIG. 2B.

Disposed behind the bezel 102 may be the sensor circuit board 104. The sensor circuit board 104 can include the corresponding and necessary electrical components, electronics, mechanical components, and other devices that interact with the input device 116 to transform the user's input into an electrical, electro-mechanical, or mechanical signal suitable for use by the touch panel assembly 100. The sensor circuit board 104 can be made from a suitable material that provides mechanical support and a mounting surface for the electrical components, electronics, mechanical components, and other devices necessary for the input device 116. As best seen in FIGS. 2C and 2D, the sensor circuit board 104 of the depicted embodiment can be disposed immediately adjacent to a surface of the bezel 102 opposite the surface with the input devices 116. Also, in the embodiment shown, the sensor circuit board 104 can be a dielectric substrate with electronics on the substrate to transform the actuating of an input device 116 into an electrical signal.

The interface circuit board 106 may be disposed adjacent to and to the rear of the sensor circuit board 104. In other embodiments, the interface circuit board 106 and the sensor circuit board 104 can be formed as a single circuit board. Alternatively, in other embodiments, the touch panel assembly 100 can include more than one sensor circuit board 104 and more than one interface circuit board 106. The interface circuit board 106 includes electrical components, electronics, mechanical components, and other devices that can transform or relay the signal received from the sensor circuit board 104 to the controlled device, such as a component of an audio entertainment system or a component of a heating and cooling system. Similar to the sensor circuit board 104, the interface circuit board 106 can be made from a suitable material that provides mechanical support and a mounting surface for the electrical components, electronics, mechanical components, and other necessary devices. As best seen in FIGS. 2C and 2D, the interface circuit board 106 of the depicted embodiment may be disposed immediately adjacent to a surface of the rear cover 112. Also, in the embodiment shown, the interface circuit board 106 can be a dielectric substrate with electronics on the substrate to transform or relay the electric signal from the sensor circuit board 104 to a device to be controlled by the touch panel assembly 100.

Figure 3:
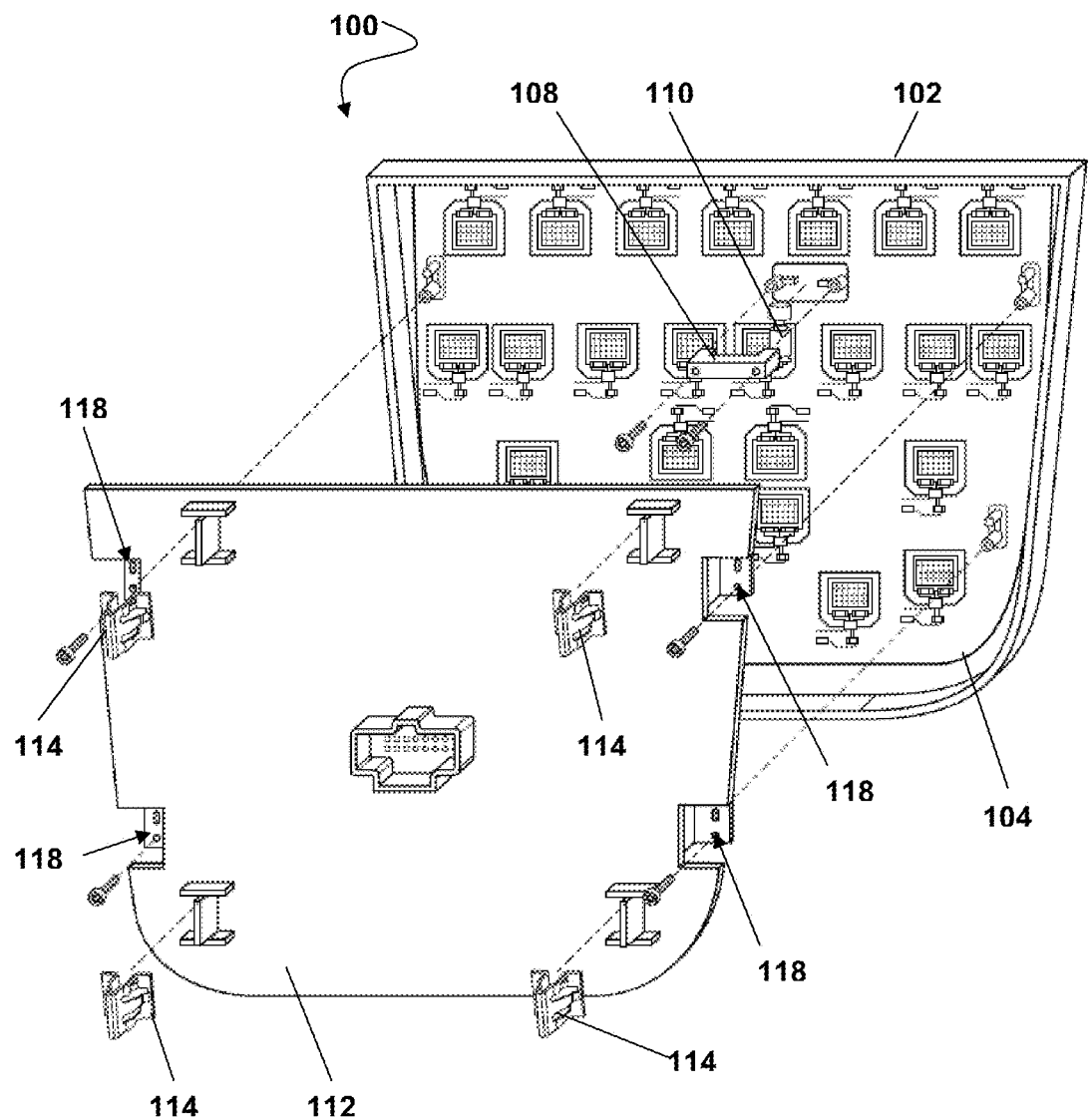
FIG. 3 is an exploded rear perspective view of the touch panel assembly illustrated in FIG. 1.

Turning to FIGS. 2C, 2D, and 3, the rear cover 112 provides protection and mechanical support. The rear cover 112 can be made from any suitable rigid material, such as, but not limited to, plastics, metals, leathers, glass, wood, combinations of the aforementioned, and other similar materials. In the embodiment shown, the rear cover 112 can join with the bezel 102 to substantially encompass the sensor circuit board 104, the interface circuit board 106, the retainer bracket 108, and the haptic effect generator 110 to form the touch panel assembly 100.

As best shown in FIGS. 2C and 2D, the rear cover 112 can be coupled to the bezel 102 by at least one flex arm assembly 118. The flex arm assembly 118 can include a coupling 120 to couple the bezel 102 to the rear cover 112 and a flexible arm portion 122. The flexible arm portion 122 allows the bezel 102 to elastically move relative to the rear cover 112. The flexible arm portion 122 can elastically bend when the haptic effect generator 110 is actuated. In the embodiment shown, the coupling 120 is a screw, and the flexible arm portion 122 is a portion of the rear cover 112 formed substantially perpendicular to the rear cover 112. The flexible arm portion 122 can also have a coupling portion 124 extending from it to engage the coupling 120. Thus, when an input device 116 on the bezel 102 is actuated, a signal can be sent to the haptic effect generator 110. The signal sent to the haptic effect generator 110 can cause it to impart a slight movement to the bezel 102 which informs the user that his manipulation of the input device 116 is being processed by the touch panel assembly 100. The movement caused by the haptic effect generator 110 can be limited by the flexible arm portion 122 of the flex arm assembly 118, and the flexible arm portion 122 can elastically return the bezel 102 to substantially its original position relative to the rear cover 112, i.e., the position before the movement caused by the haptic effect generator 110.

Furthermore, the rear cover 112 can have at least one mounting 114 to couple the touch panel assembly 100 to another structure 126. In the embodiment shown, the rear cover 112 can provide a surface for one or more mountings 114 to install the touch panel assembly 100 into the dashboard 126 of a vehicle. The one or more mountings 114 can be screws, nuts and bolts, rivets, press fittings, and other similar couplings. In the depicted embodiment, the mountings 114 are spring clips. Because the rear cover 112 has at least one flex arm assembly 118 that couples to the bezel 102 and at least one mounting 114 that couples the touch panel assembly 100 to another structure, the rear cover 112 can be coupled to a conventional control panel to provide the conventional control panel assembly with at least one flex arm assembly 118. Also, the rear cover 112 can be adapted for use with a wide variety of haptic effect generators 110 thus optimizing the balance between cost and performance. Furthermore, the rear cover 112 can provide a single component transition between the fixed structure 126, such as the dashboard, and the moving surface, such as the bezel 102.

As best shown in FIG. 2D, the retainer bracket 108 can couple the haptic effect generator 110 to the bezel 102. The haptic effect generator 110 can provide a haptic effect in response to the user manipulating an input device 116 of the bezel 102. The haptic effect generator 110 can provide linear motion, circular motion, or non-linear motion. The motion can simulate a response to a push of a mechanical button or other similar mechanical input devices. The motion provided by the haptic effect generator 110 can be caused by several different methods, such as, but not limited to, electrical, electromechanical, hydraulic, pneumatic, or mechanical. The haptic effect generator 110 can be active or passive. Active actuators can include, for example, linear current control motors, stepper motors, pneumatic/hydraulic active actuators, voice coil actuators, and other similar devices. Passive actuators can include, but are not limited to, dissipative passive actuators, linear magnetic particle brakes, linear friction brakes, pneumatic/hydraulic passive actuators, and other similar devices. Also, the haptic effect generator 110 can be, but not limited to, a solenoid, a linear resonance actuator, an eccentric rotary mass motor, a linear actuator such as the commercially available "Immersion A100," piezoelectric film, combinations of the aforementioned, or any other device that can produce a haptic effect.

To simplify the description without intending to limit the invention, the haptic effect generator 110 is described as providing a linear motion. In the embodiment shown in FIGS. 1-6, the haptic effect generator 110 can include an eccentric rotary mass, while in the embodiment shown FIGS. 8-10, the haptic effect generator 110 can include a linear actuator.

Figure 4:
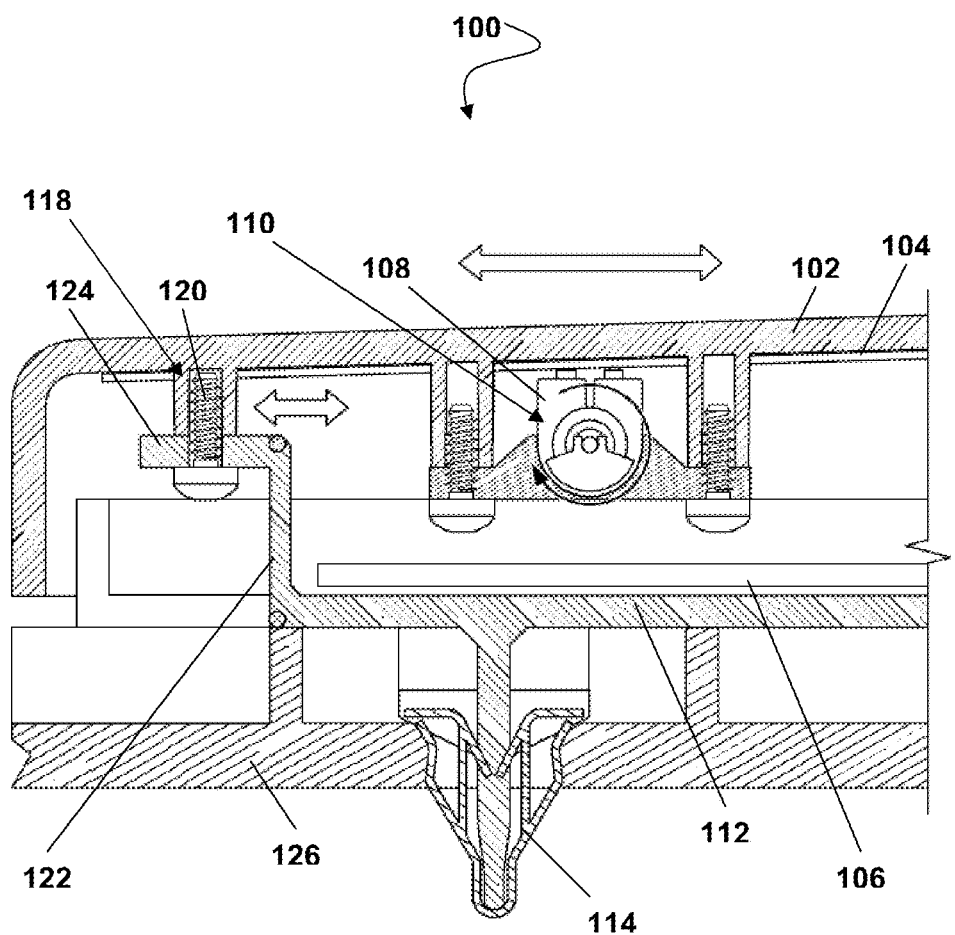
FIG. 4 is a partial sectional view in detail of the touch panel assembly illustrated in FIG. 1.
Figure 5:
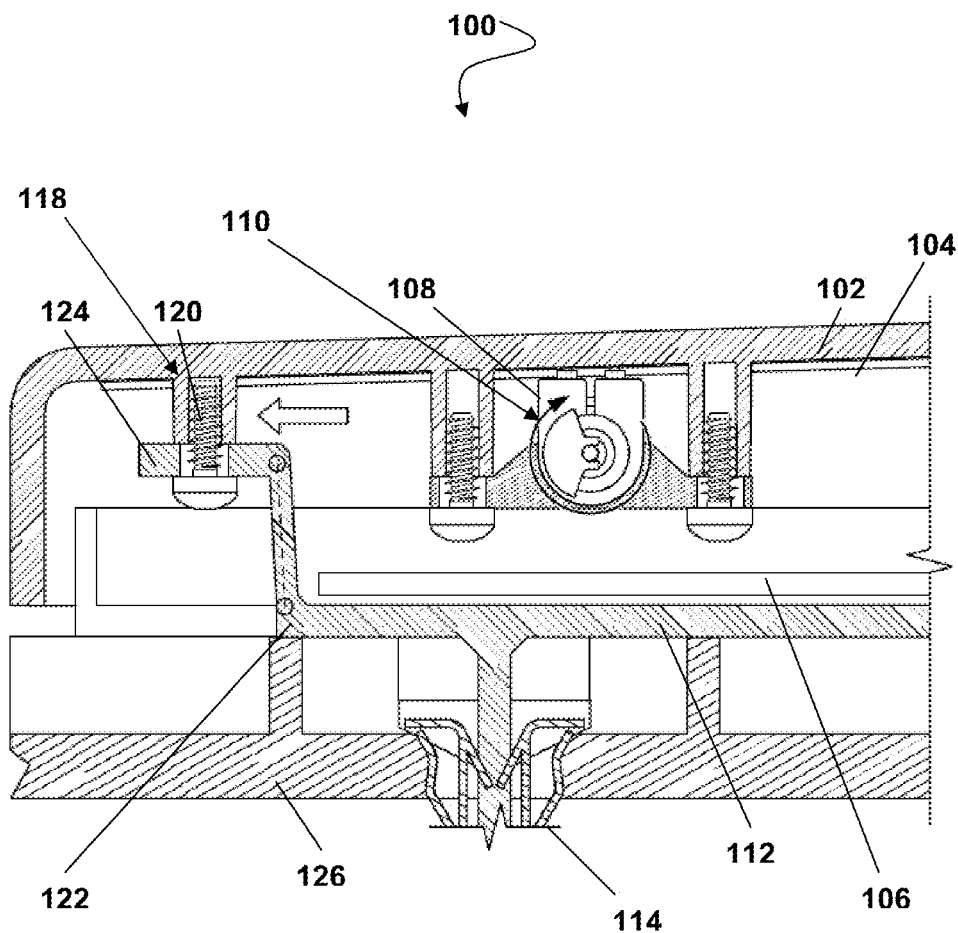
FIG. 5 is a partial sectional view in detail of the touch panel assembly illustrated in FIG. 1.
Figure 6:
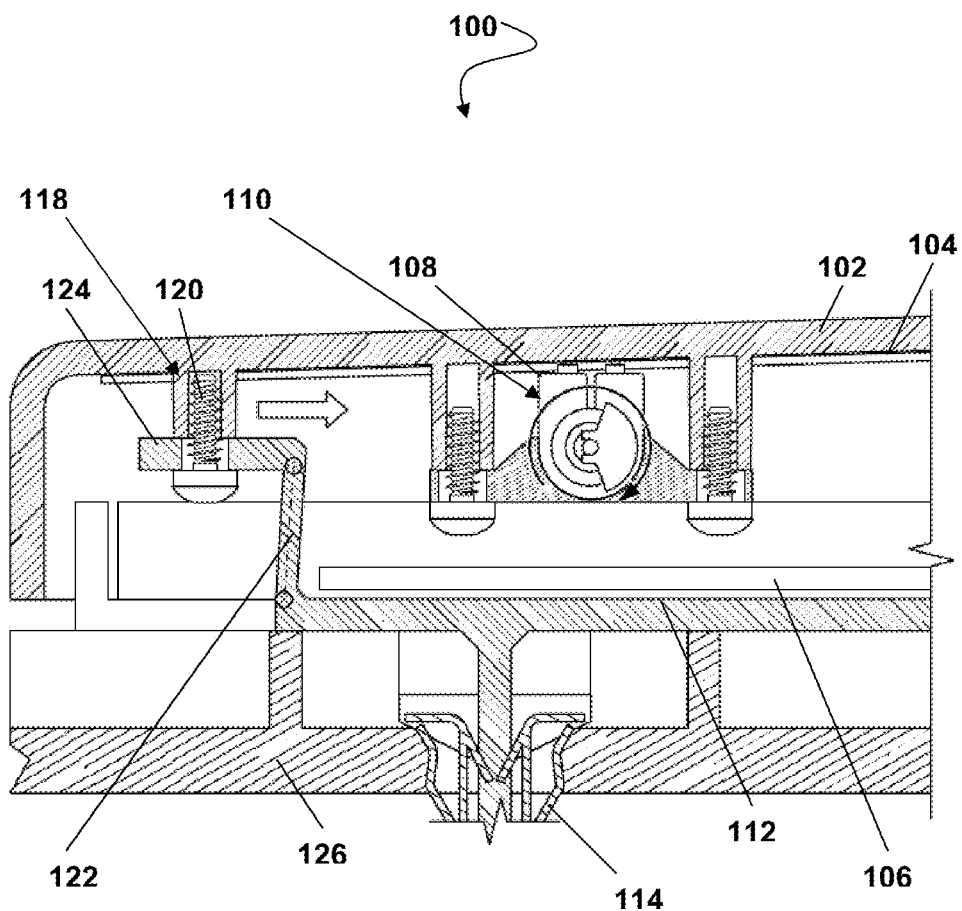
FIG. 6 is a partial sectional view in detail of the touch panel assembly illustrated in FIG. 1.

Referring to FIGS. 4-6, a sectional view of the touch panel assembly 100 is shown with the retainer bracket 108, the haptic effect generator 110, one flex arm assembly 118, and one mounting 114 shown in close proximity to each other to explain the operation of the invention. In the embodiment shown, the haptic effect generator 110 has an eccentric rotary mass. Turning to FIG. 4, the eccentric rotary mass of the haptic effect generator 110 is beginning to rotate clockwise, and the flexible arm portion 122 of the flex arm assembly 118 is shown in its substantially non-flexed state. The flexible arm portion 122 can flex either to its left or to its right, and thus, the bezel 102 can move either to its left or to its right.

Turning to FIG. 5, the eccentric rotary mass has rotated further clockwise and is disposed mostly to the left of the haptic effect generator 110. Because the mass is positioned substantially to the left of the haptic effect generator 110, the haptic effect generator 110 can cause the bezel 102 to move to the left of the figure. However, the flexible arm portion 122 elastically limits the movement of the bezel 102 to the left.

Turning to FIG. 6, the eccentric rotary mass has rotated further clockwise and is disposed mostly to the right of the haptic effect generator 110. Because the mass is positioned substantially to the right of the haptic effect generator 110, the haptic effect generator 110 can cause the bezel 102 to move to the right of the figure. As before, the flexible arm portion 122 elastically limits the movement of the bezel 102 to the right. Further movement of the rotary mass returns it to substantially its original position, and the flexible arm portion 122 substantially returns the bezel 102 to its original position relative to the rear cover 112.

To manufacture the touch panel assembly with haptic effects, a first surface can be provided. In the embodiment shown in the figures, the first surface is a surface of the bezel 102. Next, a second surface can be provided, and a flexible arm portion 122 can be disposed on the second surface. Alternatively, in some embodiments, the flexible arm portion 122 can be disposed on the first surface. The flexible arm portion 122 can include a coupling portion 124. In the embodiment shown, the second surface is a surface of the rear cover 112. Then, a coupling can couple the first surface with the second surface via the coupling portion 124. In the depicted embodiment, the coupling is a screw that extends through the coupling portion 124 of the rear cover 112 to a screw hole in the bezel 102. Next, a haptic effect generator 110 can be disposed on one of the surfaces. In the embodiment shown, the haptic effect generator 110 is attached to the bezel 102 by a retainer bracket 108. The steps are described as being performed in a particular order, but the order in which these steps are performed is not important and other orders may be suitable.

Figure 7:
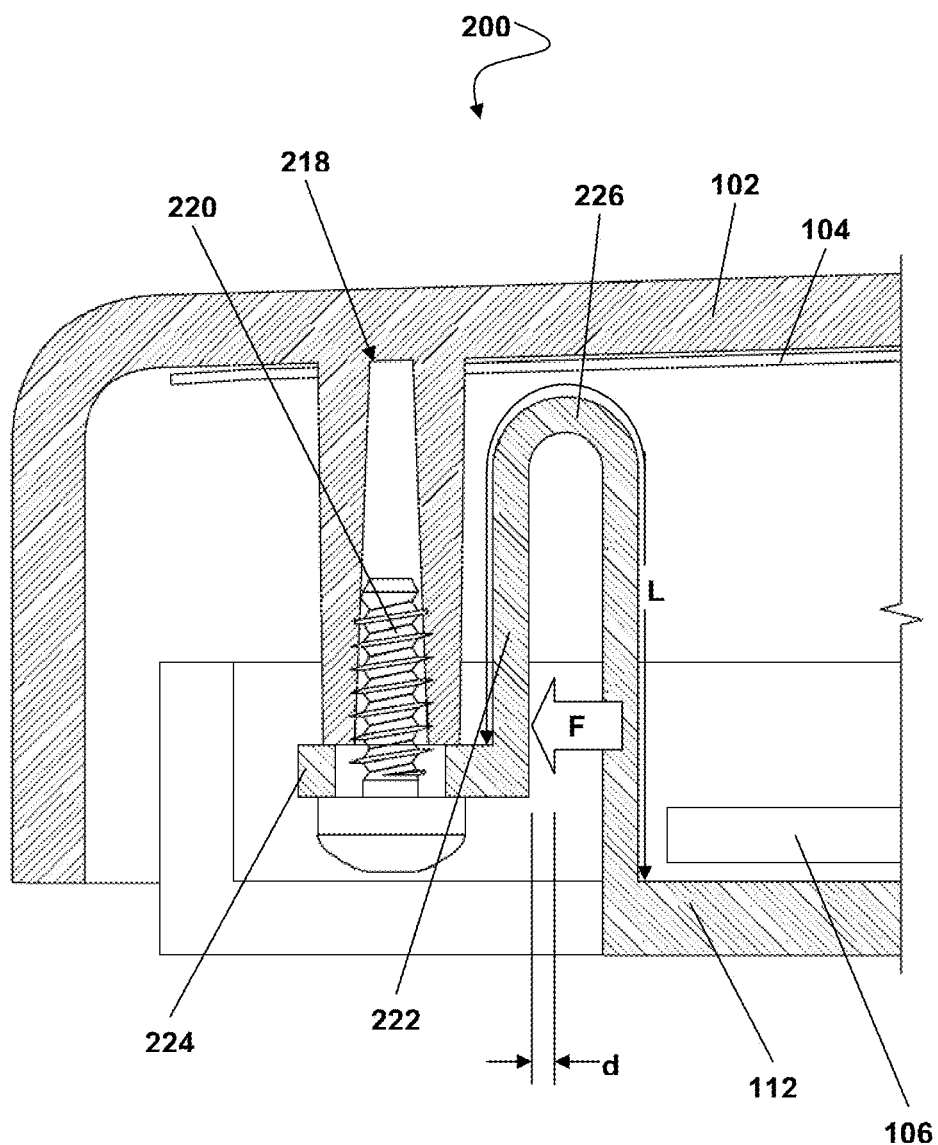
FIG. 7 is a partial sectional view in detail of a flex arm of a touch panel assembly according to another exemplary embodiment of the invention.

Referring to FIG. 7, another embodiment of the flex arm assembly 218 is shown. The flex arm assembly 218 can include a coupling 220, a flexible arm portion 222, and a coupling portion 224. The coupling 220 and the coupling portion 224 are substantially similar to the coupling 120 and the coupling portion 124, respectively, of the touch panel assembly 100. Thus, a detailed description of the coupling 220 and the coupling portion 222 are omitted. However, unlike the flexible arm portion 122, the flexible arm portion 222 can include a loop 226. The loop 226 allows the geometry of the flexible arm portion 222 to be varied. For example, the length L can be varied. Varying the geometry of the flexible arm portion 222 generally changes the elastic force F generated by the deflection d of the flexible arm portion 222. The force can be calculated with the following equations: $k=F/d$ where $F=(3dEI)/L^3$. In the equations, k is the spring constant; F is the force; d is the deflection of the flexible arm portion 222; E is modulus of elasticity of the material used for the flexible arm portion 222; L is the length of the flexible arm portion; I is the moment of inertia and can be calculated by the equation $I=bh^3/12$ for a rectangular section. In the equation $I=bh^3/12$, b is the beam width, i.e., the width of a section of the flexible arm portion 222, and h is the beam thickness, i.e., the height of a section of the flexible arm portion 222. Based on the equations above, length can be a critical variable in determining the elastic force generated by the deflection of the flexible arm portion 222.

Figure 8:
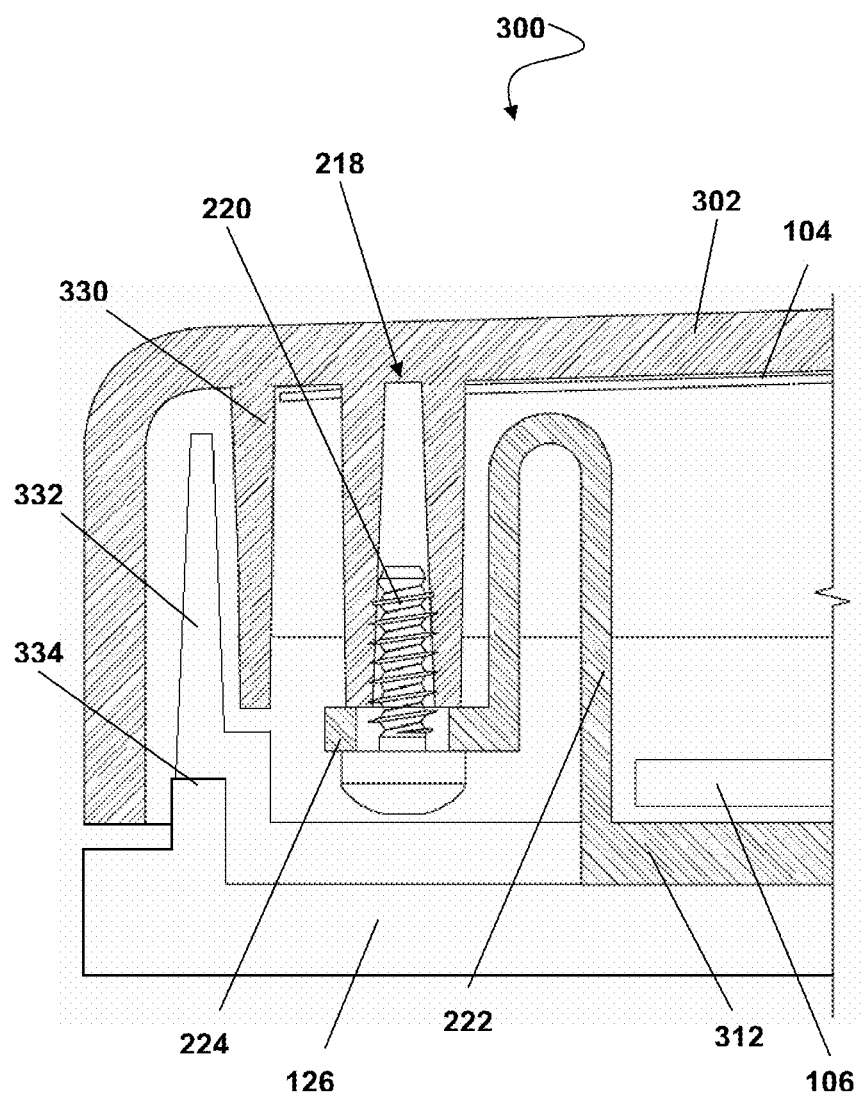
FIG. 8 is a partial sectional view in detail of a bezel and a rear cover of a touch panel assembly according to yet another exemplary embodiment of the invention.

Referring to FIG. 8, another embodiment of the bezel 302 and rear cover 312 is shown. The flex arm assembly 218 described above is also shown. The bezel 302 can include a first baffle 330, and the rear cover 312 can include a second baffle 332. The first baffle 330, the second baffle 332, or both substantially prevents debris or fluid intrusion into the touch panel assembly 300. The second baffle 332 can be provided with a sealed seat 334 to provide further protection against debris and fluid. In the embodiment shown, the first baffle 330 is placed inward of the second baffle 332. Also, the first baffle 330 and the second baffle 332 can be disposed substantially along the periphery of the bezel 302 and the rear cover 312, respectively.

Figure 9:
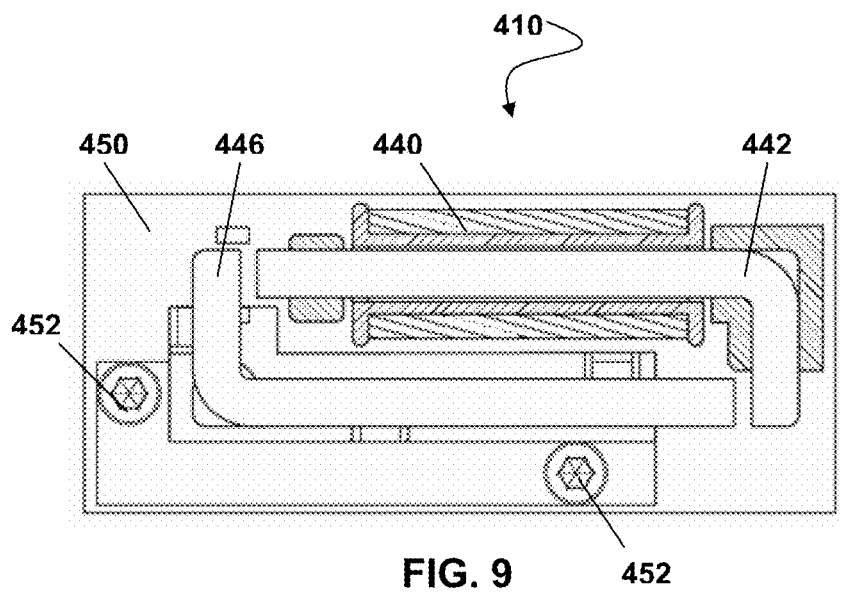
FIG. 9 is a plan view of an actuator of a touch panel assembly according to a further embodiment of the invention.

Referring to FIG. 9, an alternate embodiment of a haptic effect generator 410 is shown. Unlike the haptic effect generator 110 of the touch panel assembly 100, the haptic effect generator 410 can include an integrated electromagnetic linear actuator. A description of an electromagnetic linear actuator is described in U.S. patent application Ser. No. 11/969,071, filed Jan. 3, 2008, entitled "Haptic Actuator Assembly and Method of Manufacturing a Haptic Actuator Assembly" and is incorporated herein in its entirety by reference. In the embodiment depicted, the haptic effect generator 410 can have a coil 440, a core 442, and a ferrous body 446. The coil 440 can be made of an electrically conductive material wrapped around the core 442. The coil 440 can produce a magnetic field when an electrical current is applied to the coil 440. The core 442 can be made of a ferrous material or a material that can be magnetized in the presence of a magnetic field. When an electrical current is applied to the coil 440, a magnetic field can develop in the coil 440, and the magnetic field can cause the core 442 to be attracted magnetically to a nearby ferrous body 446.

Figure 10:
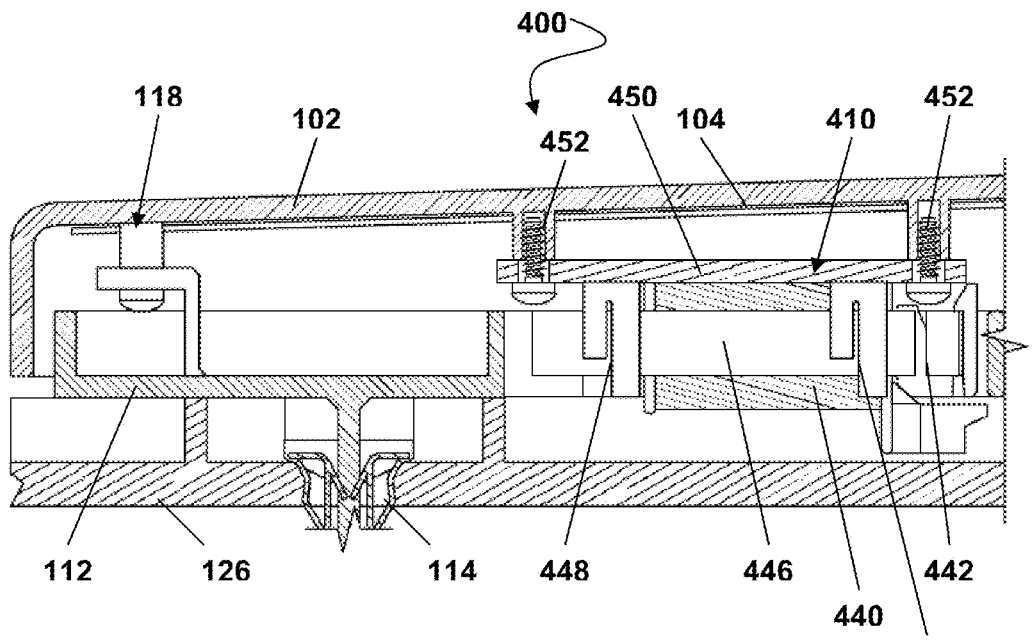
FIG. 10 is a partial sectional view in detail of the touch panel assembly according to a further embodiment of the invention.
Figure 11:
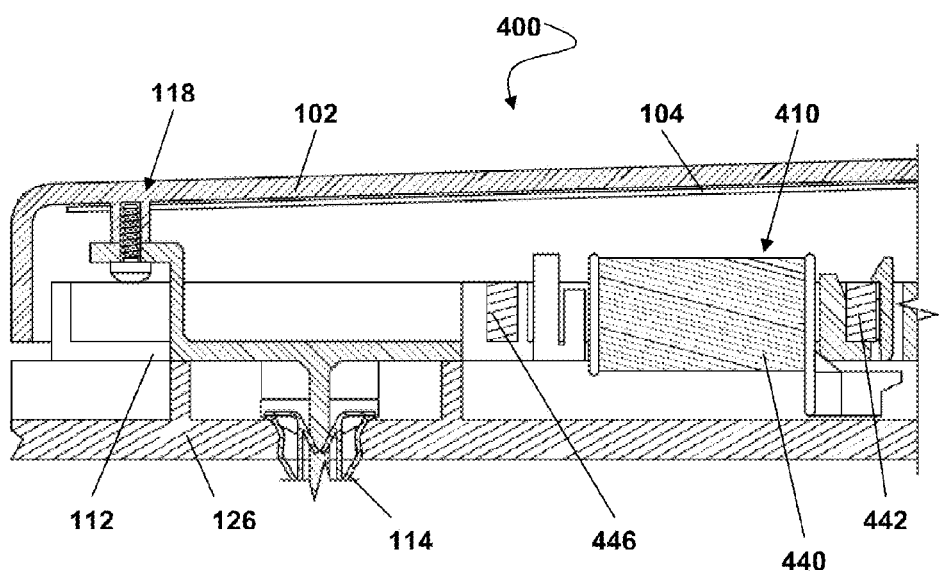
FIG. 11 is another partial sectional view in detail of the touch panel assembly illustrated in FIG. 10.

Referring to FIGS. 10 and 11, a touch panel assembly 400 is shown with the haptic effect generator 410 in different partial sectional views that show the arrangement of the coil 440, the core 442, and the ferrous body 446 relative to the bezel 102 and the rear cover 112. In the embodiment shown, the touch panel assembly 400 can include a bezel 102, a sensor circuit board 104, a rear cover 112, at least one mounting 114, and at least one flex arm assembly 118. Also, the touch panel assembly 400 can be coupled to a structure 126, such as a dashboard of a vehicle. Turning to FIG. 10, the haptic effect generator 410 is shown in section so that most of the ferrous body 446 and a tip of the core 442 can be seen. The coil 440 and the core 442 can be coupled to the rear cover 112, and the ferrous body 446 can be coupled to the bezel 102. In the embodiment shown, the ferrous body 446 can be held by supports 448 which are attached to a base 450, and the base 450 can be attached to the bezel 102 by screws 452. Turning to FIG. 11, the coil 440 and the core 442 are shown in another partial sectional view wherein a portion of the ferrous body 446 and a portion of the core 442 are shown in section. The coil 440 and the core 442 can be coupled to the rear cover 112. Thus, when the ferrous body 446 moves towards the core 442 because of the magnetic field generated by the coil 440, the bezel 102 can move with the ferrous body 446, and the bezel 102 can move relative to the rear cover 112. When the magnetic field collapses, the flex arm assembly 118 can pull the ferrous body 446 away from the core 442, and thus, the bezel 102 can return to substantially its original position before it moved.

Figure 12:
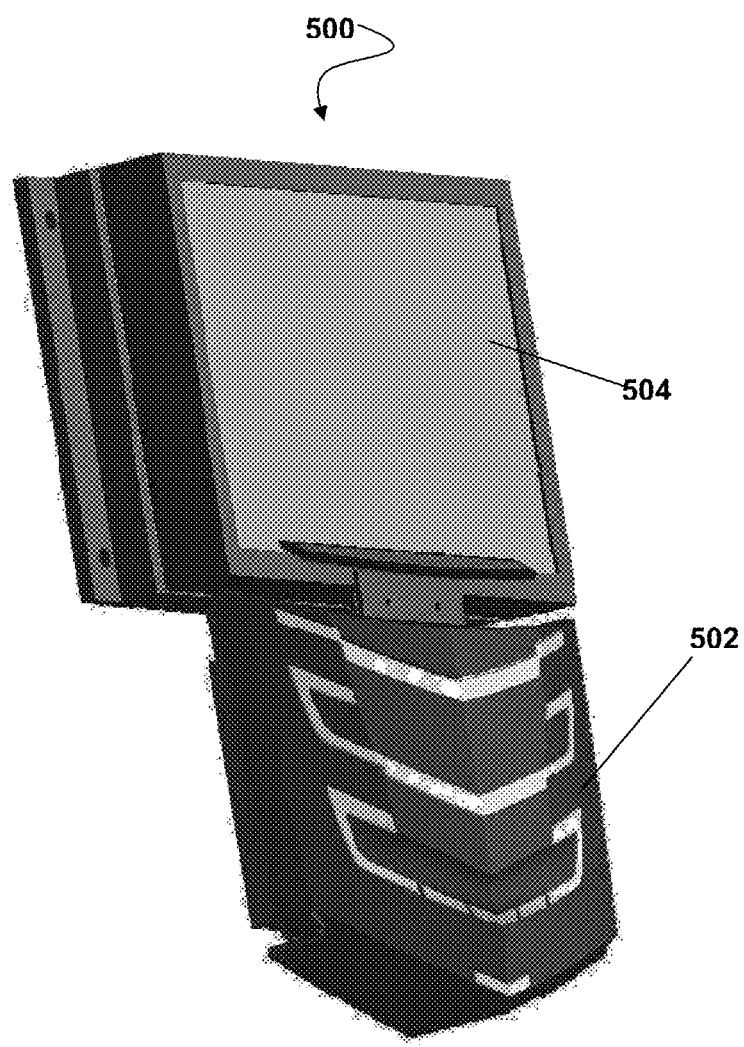
FIG. 12 is a perspective view of an assembly with haptic effects according to an exemplary embodiment of the invention.

Referring to FIGS. 12-22, an assembly 500 is shown. Turning to FIG. 12, the assembly 500 can include a touch panel portion 502 and a display portion 504. The touch panel portion 502 and the display portion 504 can provide haptic feedback. In the embodiment shown, the touch panel portion 502 can be disposed below the display portion 504. The assembly 500 may be installed in the dashboard of a vehicle.

Figure 13:
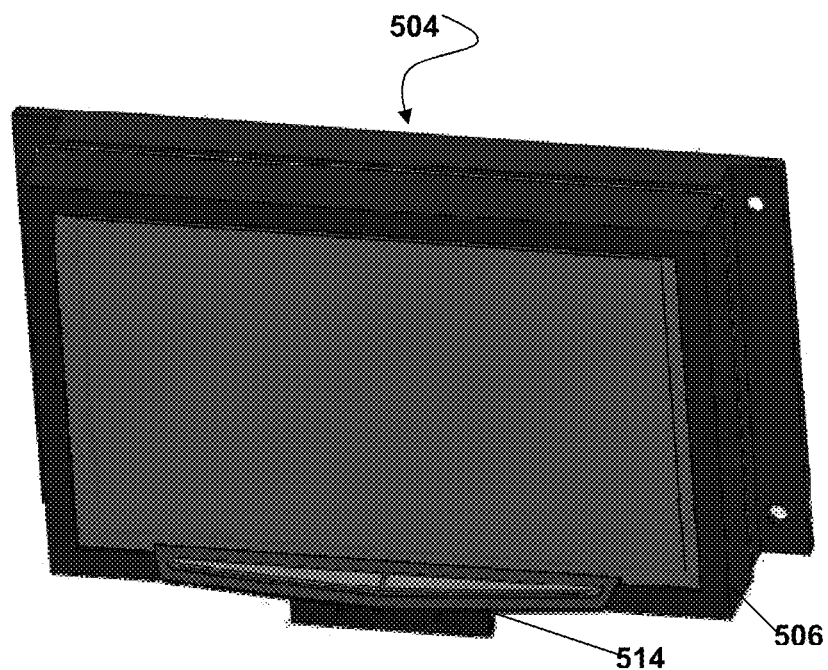
FIG. 13 is a perspective view of a display portion of the assembly illustrated in FIG. 12.
Figure 14:
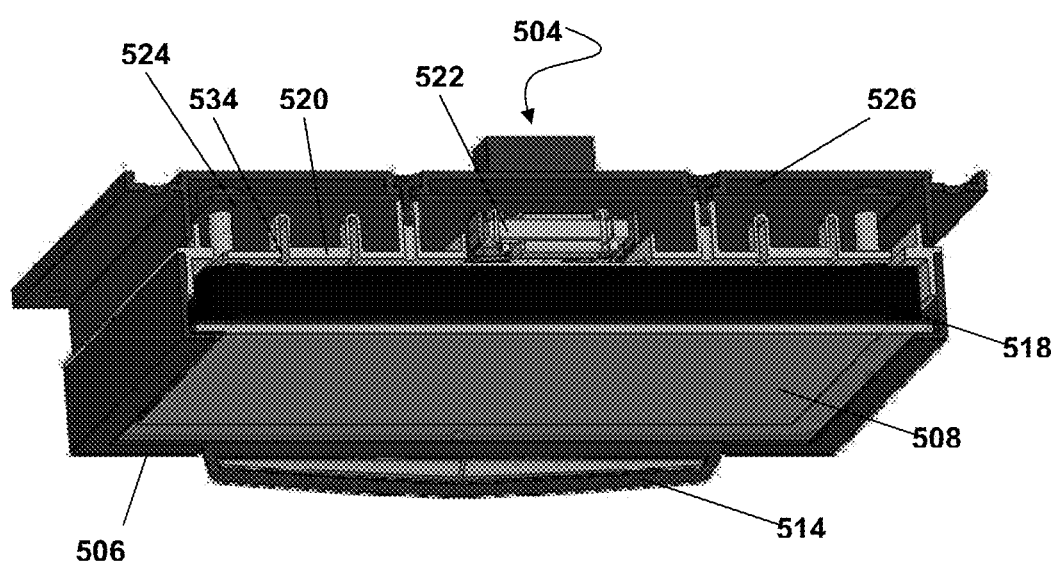
FIG. 14 is a sectional view of the display portion illustrated in FIG. 13.
Figure 15:
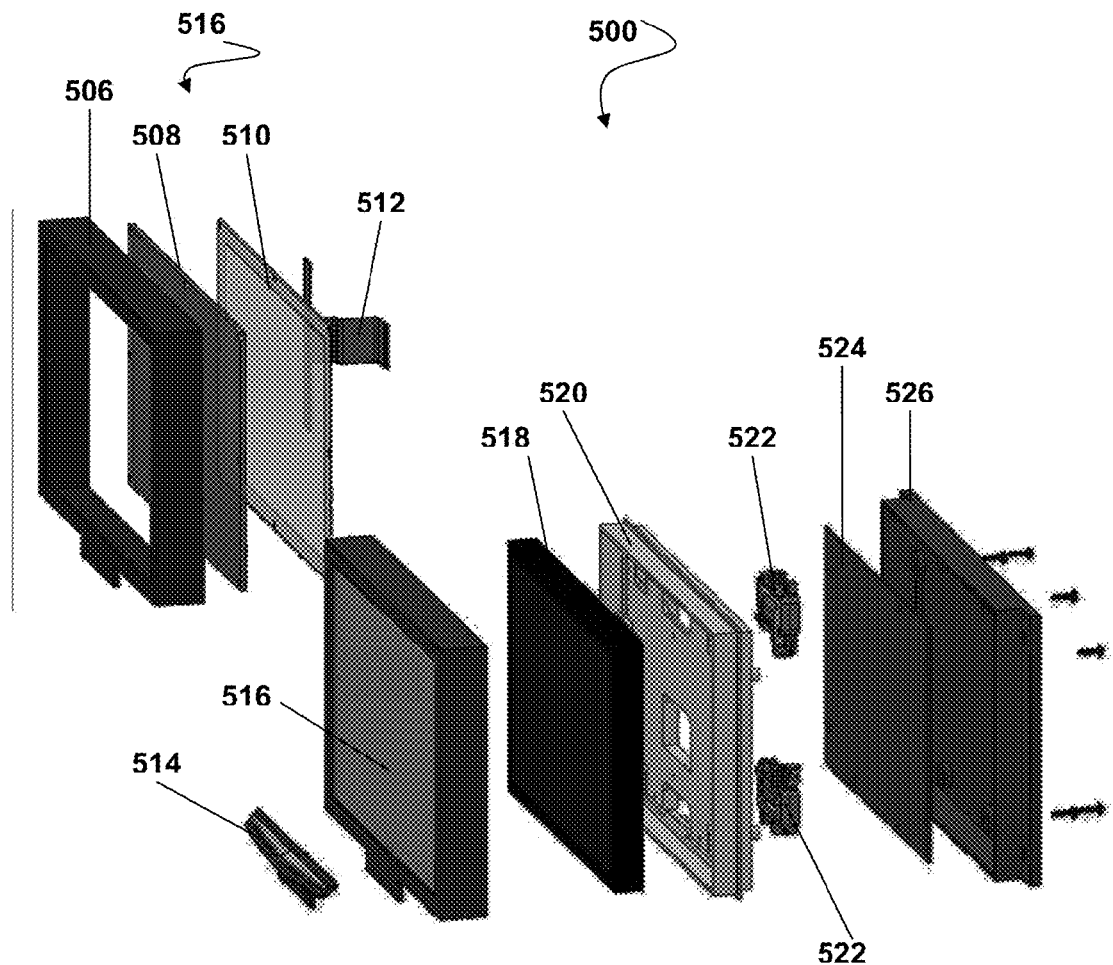
FIG. 15 is an exploded perspective view of the display portion illustrated in FIG. 13 with an exploded view of a touch screen assembly of the display portion.

Referring to FIGS. 13-15, the display portion 502 of the assembly 500 is shown. The display portion 502 can provide images to which a user responds. The display portion 502 may also accept an input provided by the user. As best shown in FIG. 15, the display portion 504 can include a mount 506, a lens 508 disposed in the mount 506, a capacitive film 510 disposed behind the lens 508, a flexible printed circuit (FPC) ribbon 512, a slider assembly 514 disposed on an edge of the mount 506, a touch screen assembly 516, a display 518, a flexible frame 520, one or more haptic actuators 522 coupled to the flexible frame 520, a circuit board 524, and a rear cover 526.

The rear cover 526, the circuit board 524, and the display 518 can be coupled such that they do not move in response to the one or more haptic actuators 522. The display 518 can be a liquid crystal display. However, the touch screen assembly 516, the lens 508, and the capacitive film 510 can be coupled so that they move in response to the one or more haptic actuators 522. Alternatively, in other embodiments, one or more other components of the display portion 502 can be made to move or not move in response to one or more haptic actuators 522.

Figure 16:
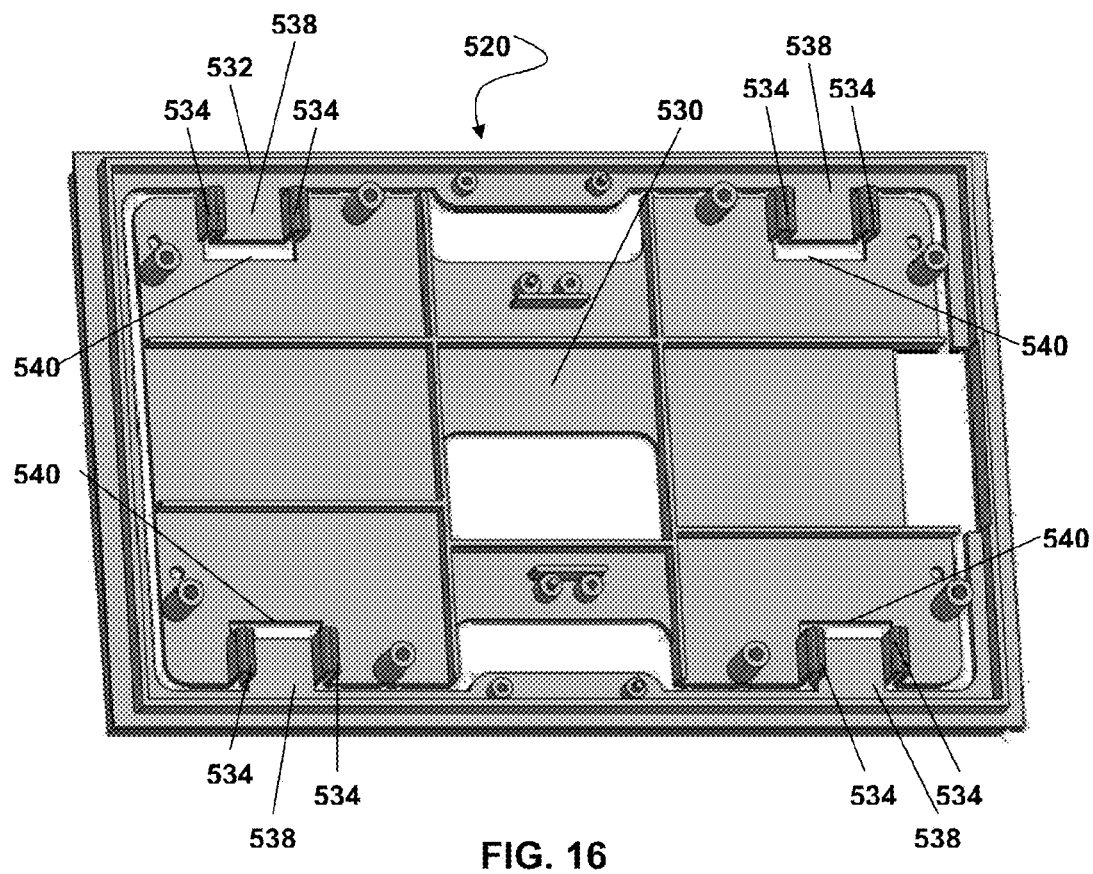
FIG. 16 is a perspective view of a flex frame of the display portion illustrated in FIG. 13.

Referring to FIG. 16, the flex frame 520 includes a fixed portion 530 and a moveable portion 532. The moveable portion 532 can be adapted to move relative to the fixed portion 530 in response to one or more haptic actuators 522. In the embodiment shown, the fixed portion 530 can be formed as a panel, while the moveable portion 532 can be formed as a perimeter frame disposed substantially around and spaced apart from the panel. With the construction shown in FIG. 16, the flex frame 520 can be formed as a single molded component.

Figure 17:
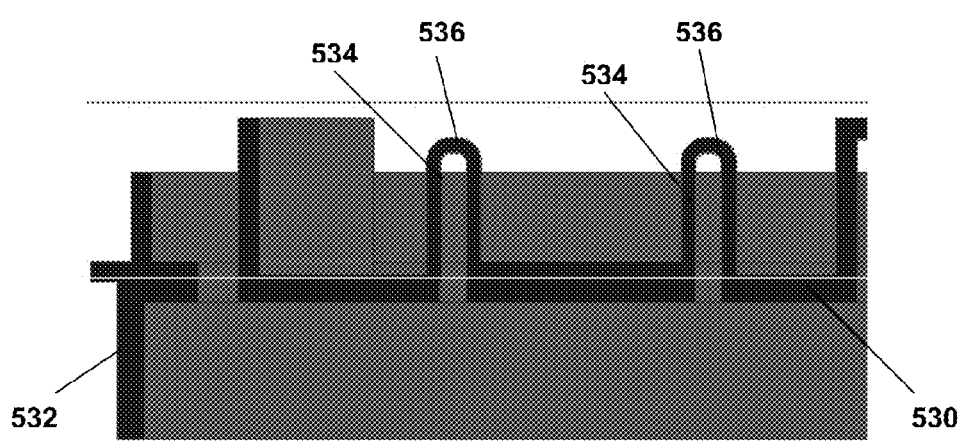
FIG. 17 is a schematic of the flex frame illustrated in FIG. 16.
Figure 18:
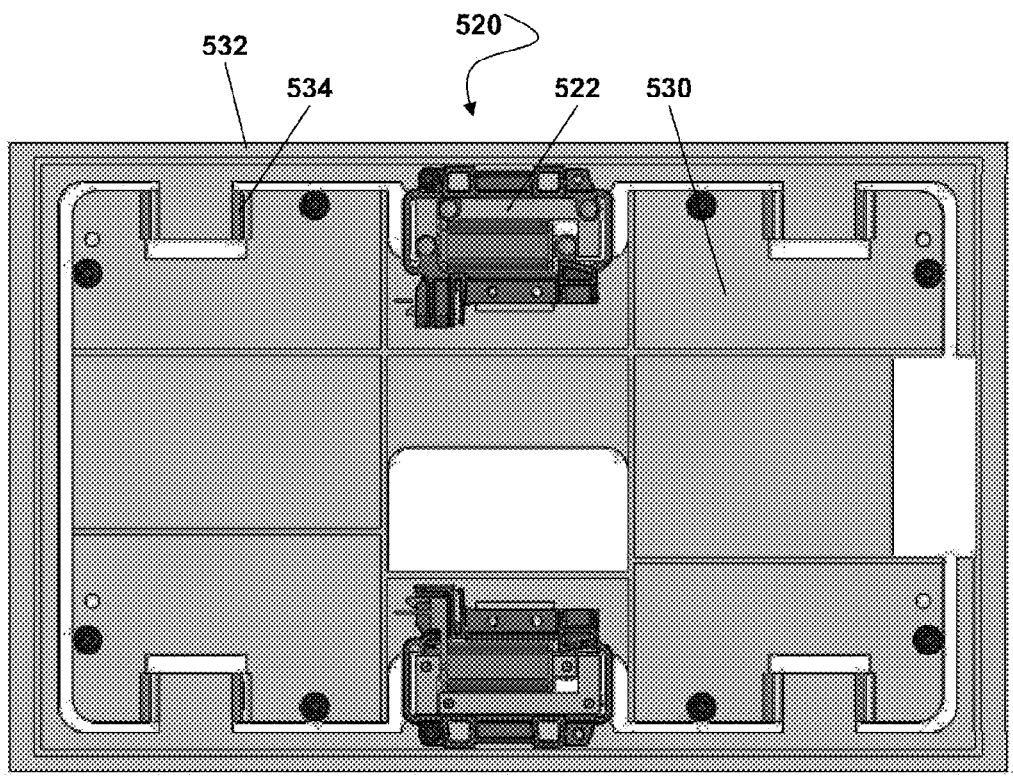
FIG. 18 is a plan view of the flex frame illustrated in FIG. 16 with haptic actuators.
Figure 19:
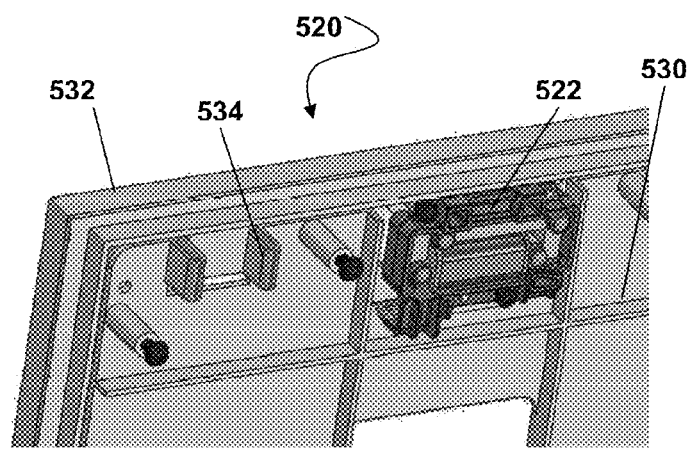
FIG. 19 is a partial perspective view in detail of the flex frame illustrated in FIG. 18.
Figure 20:
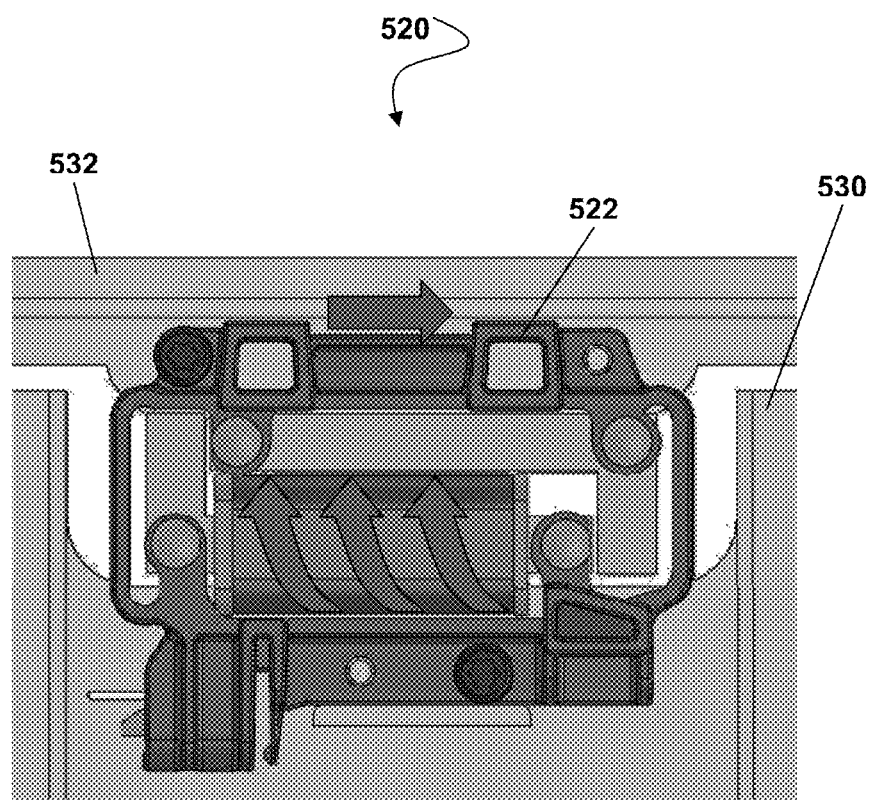
FIG. 20 is a plan view of one of the haptic actuators illustrated in FIG. 18.
Figure 21:
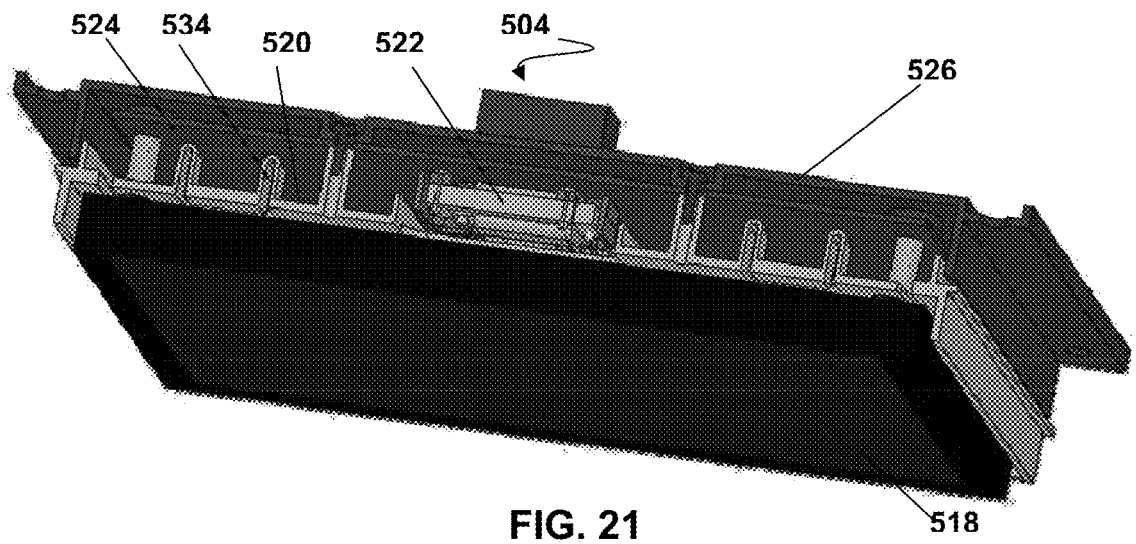
FIG. 21 is a sectional perspective view of the display portion illustrated in FIG. 13.
Figure 22:
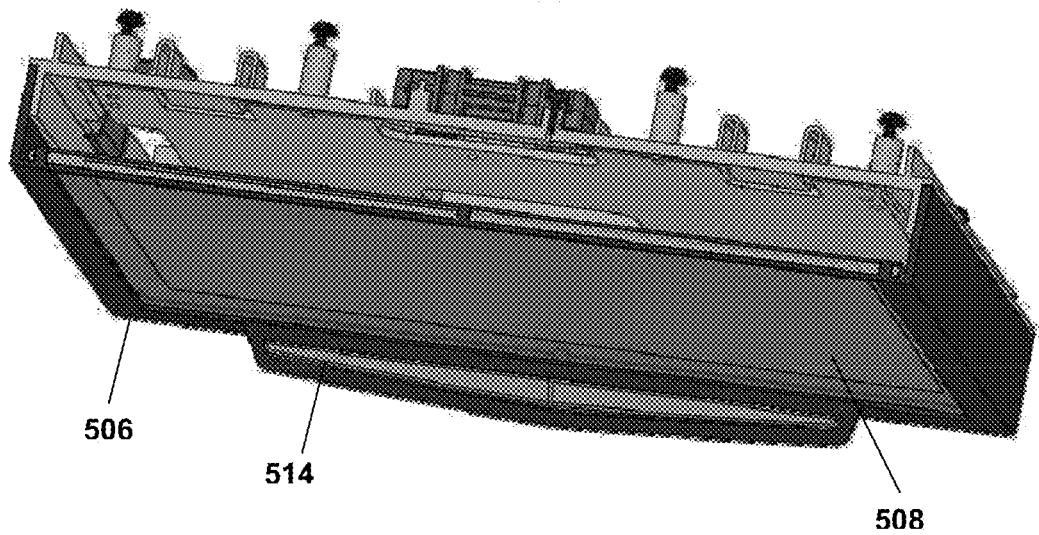
FIG. 22 is a sectional perspective view of the display portion illustrated in FIG. 13.

Referring to FIGS. 16 and 17, the flex frame 520 includes one or more flexible couplings 534 for coupling the fixed portion 530 and the moveable portion 532. The flexible couplings 534 are adapted to allow the moveable portion 532 to move relative to the fixed portion 530. The moveable portion 532 can include one or more extensions 538, and the fixed portion 530 can include one or more cutouts 540 to receive the one or extensions 538. The positions of the extensions 538 and the cutouts 540 in their respective moveable portion 532 or fixed portion 530 can determine the direction of movement of the moveable portion 532 relative to the fixed portion 530. In the embodiment shown, the flexible coupling 534 is formed integrally with the fixed portion 530 and the moveable portion 532. Also, the extensions 538 extend up or down from the moveable portion 532 relative to the figure, and the cutouts 540 are also disposed in the up and down direction of the figure. The flexible couplings 534 are disposed along the sides of the extensions 538 and its respective cutout 540. Thus, the moveable portion 532 can move to the left or right of the fixed portion 530. In other embodiments, the movable portion 532 can move in some other predetermined direction relative to the fixed portion 530. In order to provide the flexible coupling 534, a variety of structures, materials, or some combination of the aforementioned can be used. For example, the flexible coupling 534 can be made be a coiled spring, a ribbon spring, a tension or extension spring, a compression spring, a torsional spring, a cantilever spring, a loop (similar to loop 226), or some other structure that can be deformed and substantially return to its original shape. The flexible coupling 534 can be made from rubber, plastic, polymer, metal, alloy, or some other material that can be deformed and substantially return to its original shape. The flexible coupling 534 can be made separately or integrally with the fixed portion 530, the moveable portion 532, or both.

In the depicted embodiment, the flexible coupling 534 includes a loop 536 disposed between its couplings to the fixed portion 530 and the moveable portion 532. Also, in the embodiment shown, eight flexible couplings 534 can be disposed near the far corners of the fixed portion 530. However, the number of flexible couplings 534 is not meant to be limiting, and in other embodiments, there may be more or less than the eight flexible couplings 534 shown.

Referring to FIGS. 18-22, the flex frame 520 is shown coupled with a haptic actuator 522. The haptic actuator 522 can be coupled to the fixed portion 530 and the moveable portion 532. The haptic actuator 522 shown is substantially similar to haptic actuator 410, thus a detailed description thereof is omitted.

Referring to FIGS. 23-25, the flex frame 520 is shown coupled to another haptic actuator 536. In the embodiment shown, the haptic actuator 536 is coupled only to the moveable portion 532. The depicted haptic actuator 536 is substantially similar to haptic effect generator 110, and thus a detailed description thereof is omitted.

Figure 26:
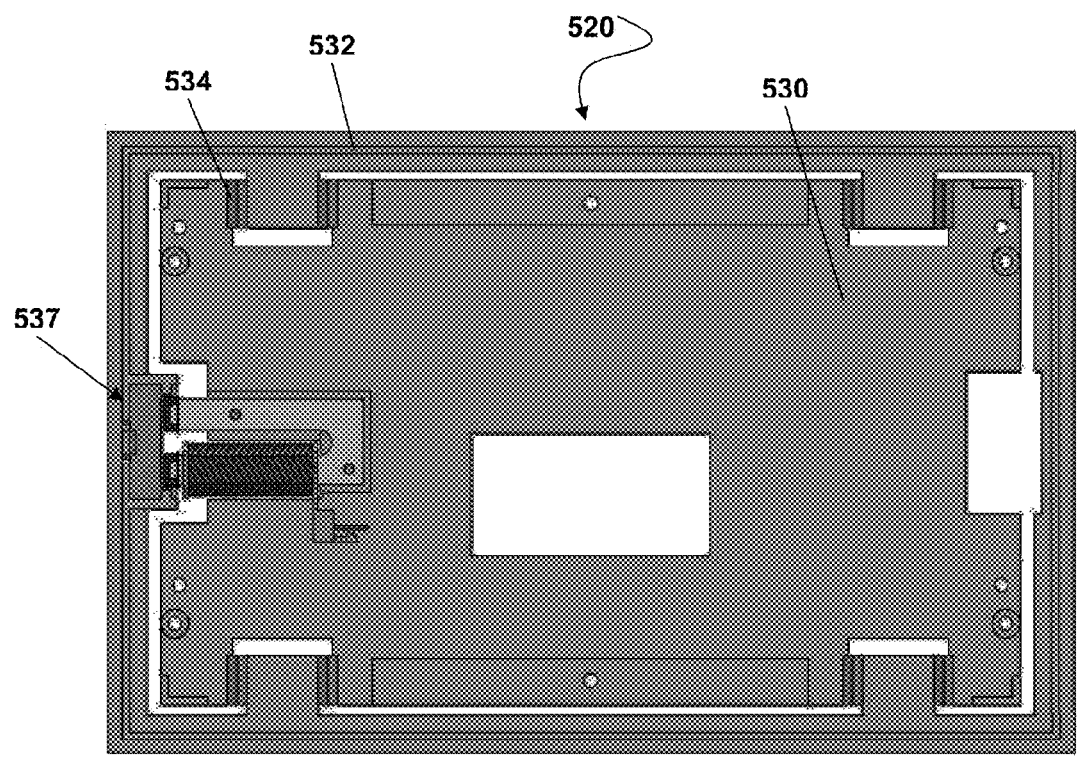
FIG. 26 is a plan view of a flex frame according to yet another embodiment of the invention.
Figure 27:
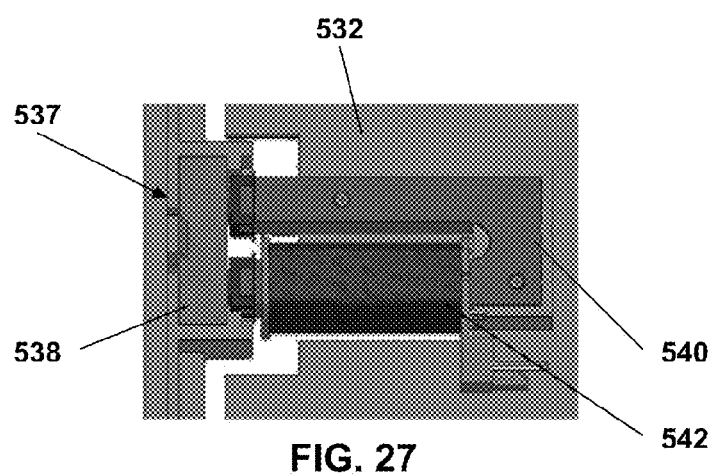
FIG. 27 is a plane view of a haptic actuator of the flex frame illustrated in FIG. 26.
Figure 28:
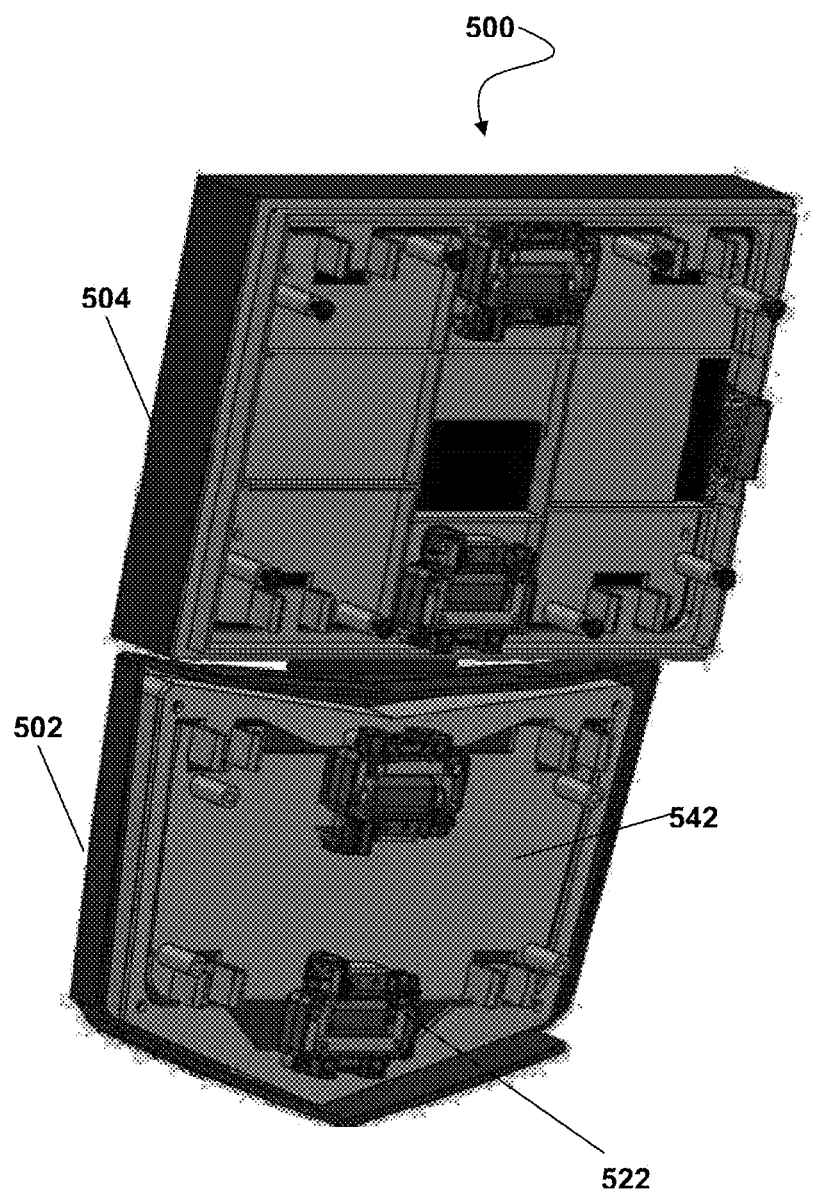
FIG. 28 is a rear perspective view of the assembly illustrated in FIG. 12.
Figure 29:
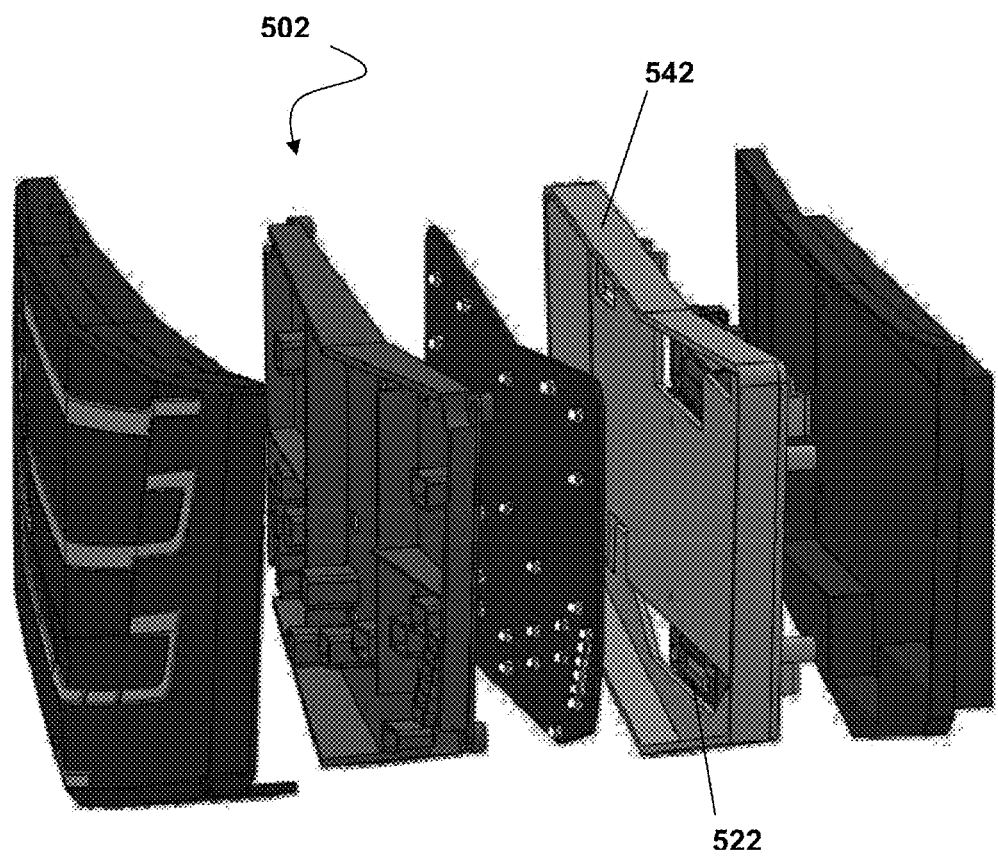
FIG. 29 is an exploded perspective view of a touch panel portion of the assembly illustrated in FIG. 12.
Figure 30:
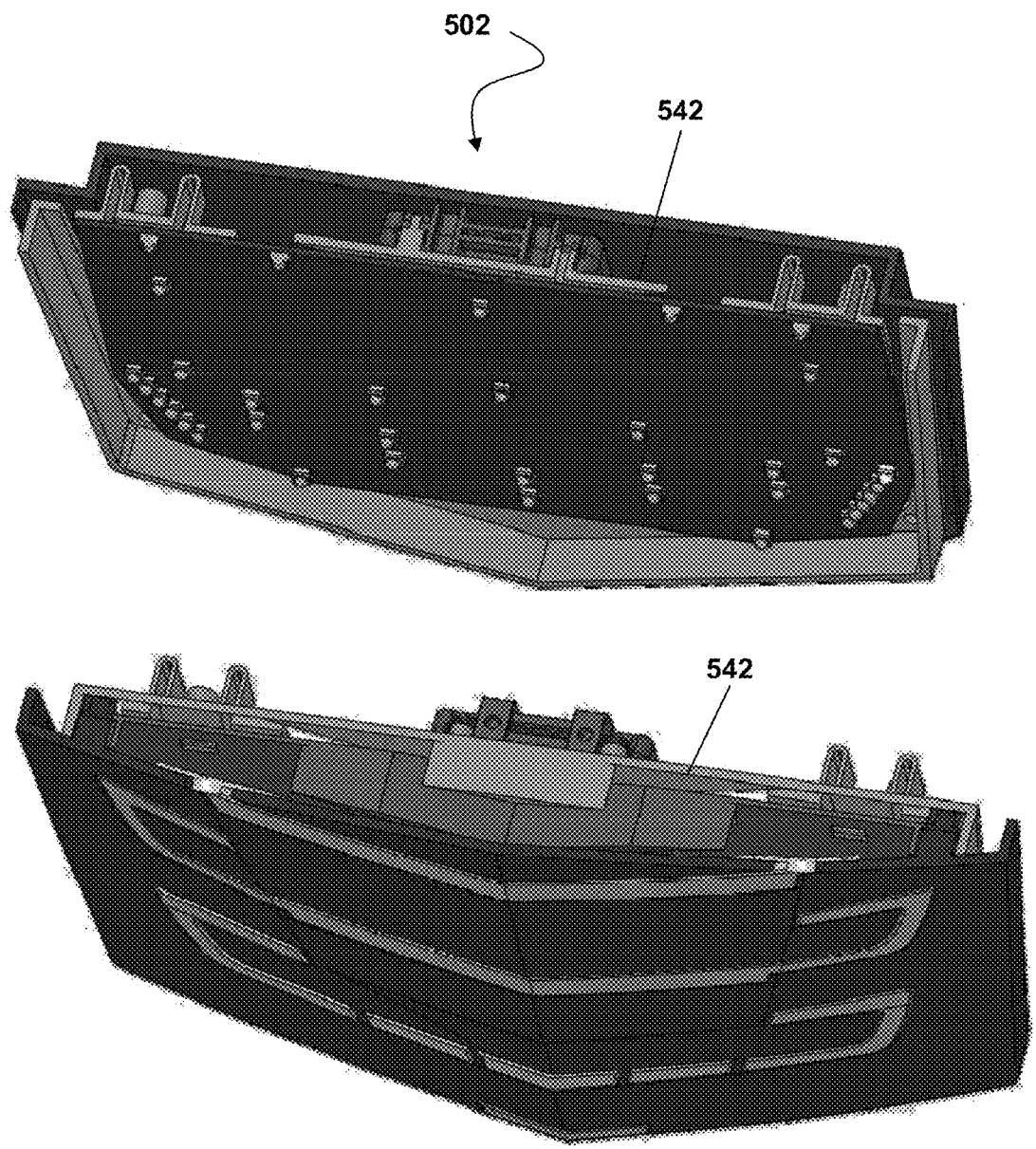
FIG. 30 is a sectional perspective view of the touch panel portion illustrated in FIG. 29.
Figure 31:
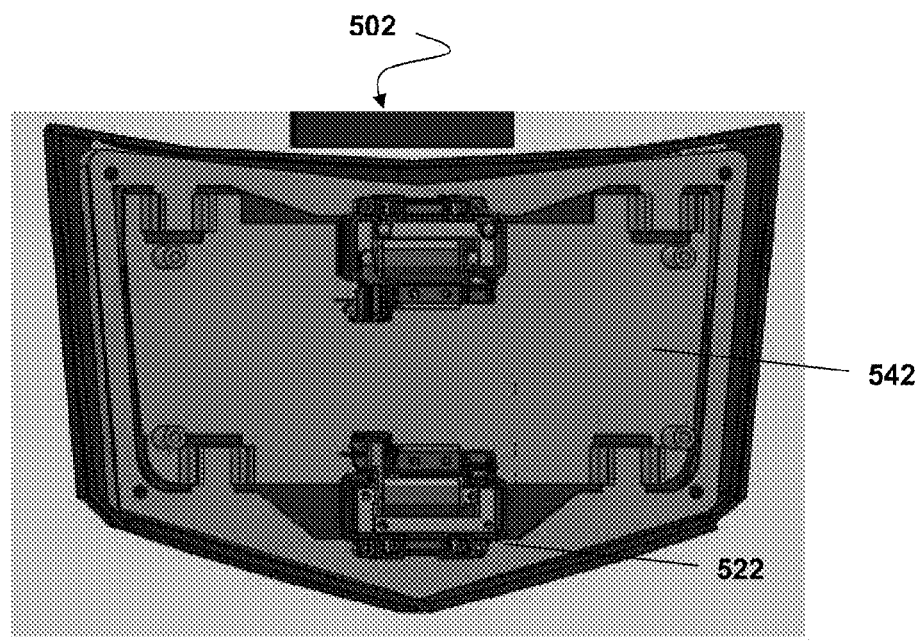
FIG. 31 is a rear view of the touch panel portion illustrated in FIG. 29.
Figure 32:
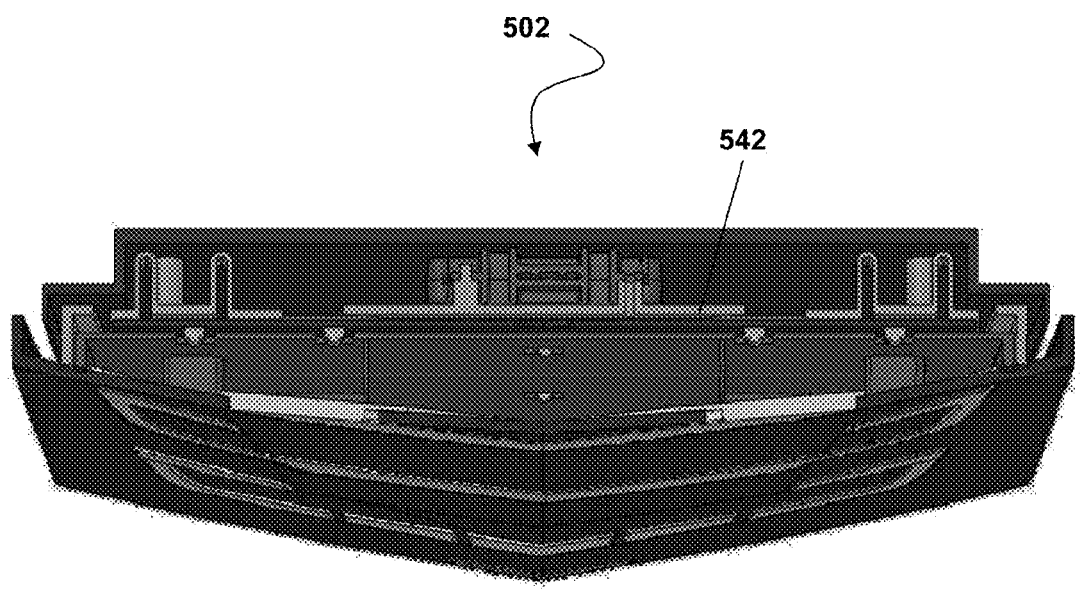
FIG. 32 is a sectional view of the touch panel portion illustrated in FIG. 29.
Figure 33:
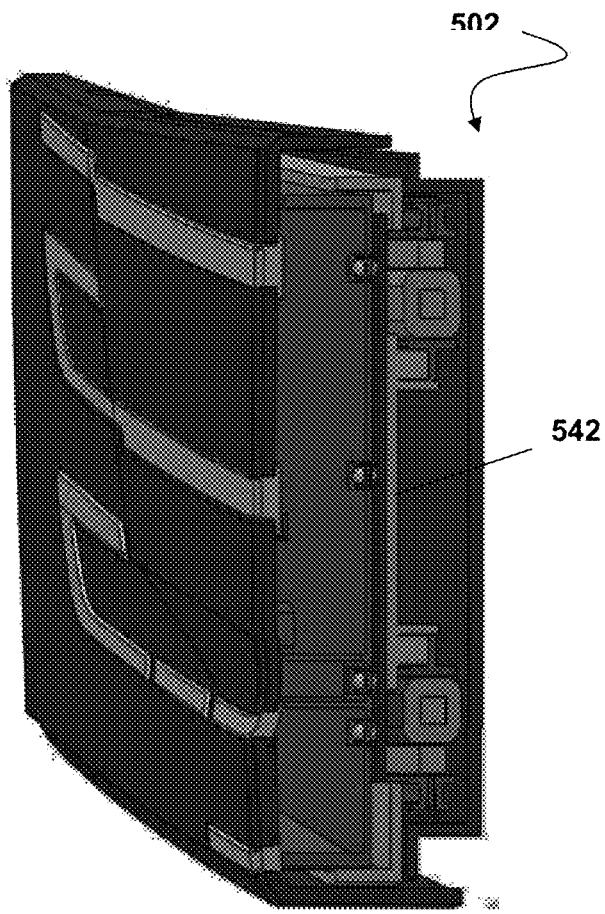
FIG. 33 is a sectional view of the touch panel portion illustrated in FIG. 29.
Figure 34:
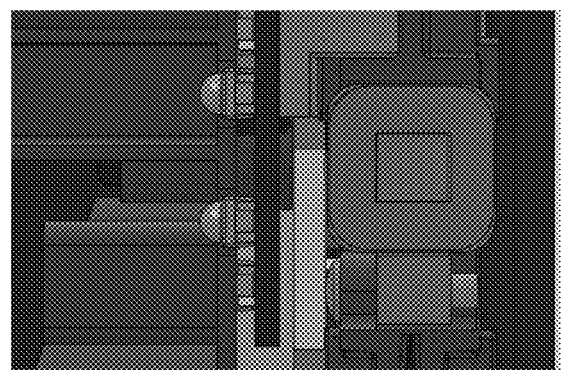
FIG. 34 is a partial sectional view of the touch panel portion illustrated in FIG. 29.
Figure 35:
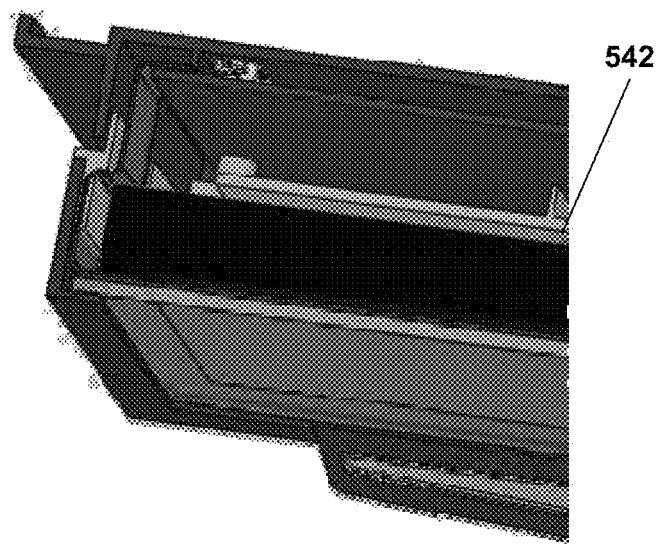
FIG. 35 is a partial sectional view of the touch panel portion illustrated in FIG. 29.
Figure 36:
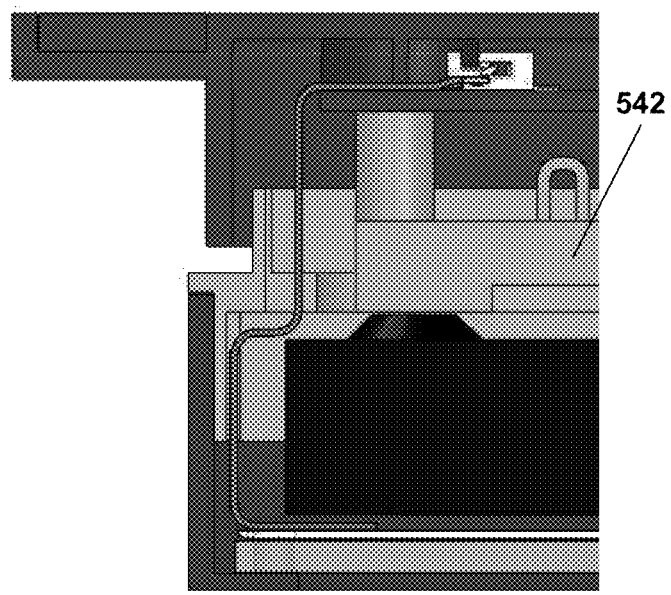
FIG. 36 is a partial sectional view of the touch panel portion illustrated in FIG. 29.

Referring to FIGS. 26-27, the flex frame 520 is shown coupled to yet another haptic actuator 537. In the embodiment shown, the haptic actuator 537 can be coupled to the fixed portion 530 and the moveable portion 532. The haptic actuator 537 can include a first ferrous body 538, a second ferrous body 540 disposed adjacent and spaced apart from the first ferrous body 538, and a coil 542 disposed around the second ferrous body 540. The coil 542 can be made of an electrically conductive material wrapped around the second ferrous body 538. The coil 542 can produce a magnetic field when an electrical current is applied to the coil 542. The first ferrous body 538 and the second ferrous body 540 can be made of a ferrous material or a material that can be magnetized in the presence of a magnetic field. When an electrical current is applied to the coil 542, a magnetic field can be developed in the coil 542, and the magnetic field can cause the second ferrous body 540 to be attracted magnetically to the nearby first ferrous body 538.

In the embodiment shown, the first ferrous body 538 can be coupled to the moveable portion 532, and the second ferrous body 540 can be coupled to the fixed portion 530. Thus, when the first ferrous body 538 moves towards the second ferrous body 540 because of the magnetic field generated by the coil 542, the moveable portion 532 can move with the first ferrous body 538, and the moveable portion 532 can move relative to the fixed portion 530. When the magnetic field collapses, the flexible couplings 534 can pull the first ferrous body 538 away from the second ferrous body 540, and thus, the moveable portion 532 can return to substantially its original position relative to the fixed portion 530 before it moved.

Referring to FIGS. 28-36, the touch panel portion 502 of the assembly 500 is shown. As shown in these figures, the touch panel portion 502 can include one or more haptic actuators 522 and a flex frame 542. The flex frame 542 is similar to the flex frame 520.

As apparent from the above description, the invention provides a touch panel assembly 100 with haptic effects and a method of manufacturing the touch panel assembly 100 with haptic effects. At least one haptic effect generator 110 and at least one flexible arm portion 122 are coupled to the touch panel assembly 100 so that a slight movement is imparted to the bezel 102 in response to the user manipulating an input device 116 disposed on the bezel 102. Thus, the haptic effect generator 110 and the flexible arm portion 122 provide a system with haptic feedback at reduced cost, with simpler manufacturing requirements at lower cost, and with reduced premature component failure.

While a particular embodiment has been chosen to illustrate the invention, it will be understood by those skilled in the art that various changes and modifications can be made therein without departing from the scope of the invention as defined in the appended claims.

What is claimed is:

1. An assembly for providing haptic effects, the assembly comprising:
    a panel adapted to be coupled to another structure;
    a frame disposed around and spaced apart from the panel;
    at least one flexible coupling to couple the panel to the frame, wherein the at least one flexible coupling is a flexible member that is molded as an integral part of the frame and the panel;
    a display coupled to the panel so as to be stationary with respect to the panel;
    a touch screen assembly coupled to the frame and disposed over the display; and
    a haptic actuator coupled to the frame such that movement generated by the haptic actuator is imparted through the frame to create the haptic effects on the touch screen assembly.

2. An assembly according to claim 1, wherein the frame includes one or more extensions.

3. An assembly according to claim 2, wherein the panel includes one or more cutouts to receive a respective one of the one or more extensions of the frame.

4. An assembly according to claim 3, wherein the at least one flexible coupling is disposed near one of the one or more extensions and its respective one of the one or more cutouts.

5. An assembly according to claim 1, wherein the haptic actuator is coupled to the panel and the frame.

6. An assembly according to claim 1, wherein the haptic actuator is a linear actuator.

7. An assembly according to claim 1, wherein the haptic actuator includes an eccentric rotary mass.

8. An assembly according to claim 1, wherein:
    the display is coupled to a first surface of the panel,
    the touch screen assembly is coupled to a second surface of the frame, and
    the first surface and the second surface are substantially co-planar.

9. An assembly for providing haptic effects, the assembly comprising:
    a panel adapted to be coupled to another structure;
    a frame disposed around and spaced apart from the panel;
    at least one flexible coupling to couple the panel to the frame, wherein the at least one flexible coupling is a flexible member that is molded as an integral part of the frame and the panel;
    an input device coupled to the frame;
    a display coupled to the panel so as to be stationary with respect to the panel and disposed under the input device; and
    a haptic actuator coupled to the frame such that movement generated by the haptic actuator is imparted through the frame to create the haptic effects on the input device.

10. An assembly according to claim 9, wherein the frame includes one or more extensions.

11. An assembly according to claim 10, wherein the panel includes one or more cutouts to receive a respective one of the one or more extensions of the frame.

12. An assembly according to claim 11, wherein the at least one flexible coupling is disposed near one of the one or more extensions and its respective one of the one or more cutouts.

13. An assembly according to claim 9, wherein the haptic actuator is a linear actuator.

14. An assembly according to claim 9, wherein the haptic actuator includes an eccentric rotary mass.

15. A method of providing haptic effects on a touch screen assembly, the method comprising:
    molding a panel adapted to be coupled to another structure, a frame disposed around and spaced apart from the panel, and at least one flexible coupling to couple the panel to the frame, wherein the at least one flexible coupling is molded as an integral part of the frame and the panel;
    coupling a display to the panel so as to be stationary with respect to the panel;
    coupling a touch screen assembly to the frame such that the touch screen assembly is disposed over the display; and
    coupling a haptic actuator to the frame such that movement generated by the haptic actuator is imparted through the frame to create the haptic effects on the touch screen assembly.

16. A method according to claim 15, wherein the haptic actuator is a linear actuator.

17. A method according to claim 15, wherein the haptic actuator includes an eccentric rotary mass.

18. A method of providing haptic effects on an input device, the method comprising:

molding a panel adapted to be coupled to another structure, a frame disposed around and spaced apart from the panel, and at least one flexible coupling to couple the panel to the frame, wherein the at least one flexible coupling is molded as an integral part of the frame and the panel;

coupling a display to the panel so as to be stationary with respect to the panel;

coupling an input device to the frame such that the input device is disposed over the display; and coupling a haptic actuator to the frame such that movement generated by the haptic actuator is imparted through the frame to create the haptic effects on the input device.

19. A method according to claim 18, wherein the haptic actuator is a linear actuator.

20. A method according to claim 18, wherein the haptic actuator includes an eccentric rotary mass.

* * * * *